US012673526B2

(12) United States Patent
Ellifson

(10) Patent No.: US 12,673,526 B2
(45) Date of Patent: Jul. 7, 2026

(54) SYSTEMS AND METHODS FOR A SUSPENSION ASSEMBLY ON A VOCATIONAL VEHICLE

(71) Applicant: Oshkosh Corporation, Oshkosh, WI (US)

(72) Inventor: Erik Ellifson, Oshkosh, WI (US)

(73) Assignee: Oshkosh Corporation, Oshkosh, WI (US)

( * ) Notice: Subject to any disclaimer, the term of this patent is extended or adjusted under 35 U.S.C. 154(b) by 0 days.

(21) Appl. No.: 19/016,714

(22) Filed: Jan. 10, 2025

(65) Prior Publication Data

US 2025/0229589 A1 Jul. 17, 2025

Related U.S. Application Data

(60) Provisional application No. 63/620,395, filed on Jan. 12, 2024.

(51) Int. Cl.
B60G 17/015 (2006.01)
B60G 7/00 (2006.01)
(Continued)

(52) U.S. Cl.
CPC ......... B60G 17/0152 (2013.01); B60G 7/001 (2013.01); B60G 15/062 (2013.01);
(Continued)

(58) Field of Classification Search
CPC .. B60G 17/0152; B60G 7/001; B60G 15/062; B60G 17/019; B60G 2200/156;
(Continued)

(56) References Cited

U.S. PATENT DOCUMENTS 3,038,739 A * 6/1962 Vogel ................. B60G 17/0155
280/124.141
4,143,887 A * 3/1979 Williams ................. B60G 3/06
267/276
(Continued)

FOREIGN PATENT DOCUMENTS

WO WO-2012172455 A2 * 12/2012 ....... B60G 17/01908

OTHER PUBLICATIONS

Translation of WO-2012172455-A2.*

*Primary Examiner* — Jason D Shanske
*Assistant Examiner* — Shams Dhanani
(74) *Attorney, Agent, or Firm* — Foley & Lardner LLP

(57) ABSTRACT

A suspension assembly includes an upper control arm, a lower control arm, a damper coupled between the lower control arm and a frame rail, and a roll control cylinder coupled between the lower control arm and the frame rail. The roll control cylinder includes a body defining an internal cavity, a piston movably arranged within internal cavity, and a rod coupled to the piston and extending outwardly from the body. The piston divides the internal cavity into a piston chamber and a rod chamber. The suspension assembly further includes an accumulator in fluid communication with the piston chamber, and a charge supply in fluid communication with the accumulator. The charge supply is configured to selectively change a charge pressure within the accumulator to adjust a roll rate or stiffness defined by the roll control cylinder.

19 Claims, 11 Drawing Sheets

(51) Int. Cl.
    B60G 15/06        (2006.01)
    B60G 17/019       (2006.01)
(52) U.S. Cl.
    CPC ...... B60G 17/019 (2013.01); B60G 2200/156
        (2013.01); B60G 2202/312 (2013.01); B60G
        2202/416 (2013.01); B60G 2204/62 (2013.01);
        B60G 2300/026 (2013.01); B60G 2400/0511
        (2013.01); B60G 2800/012 (2013.01)
(58) Field of Classification Search
    CPC ........ B60G 2202/312; B60G 2202/416; B60G
        2204/62; B60G 2300/026; B60G
        2400/0511; B60G 2800/012; B60G
        2202/154; B60G 2202/24; B60G 21/073;
        B60G 2204/8304; B60G 21/005; B60G
        21/106; B60G 21/026
    See application file for complete search history.

(56) References Cited

U.S. PATENT DOCUMENTS

| | | | | |
|---|---|---|---|---|
| 5,116,069 | A * | 5/1992 | Miller .................... | B62D 61/08 |
| | | | | 280/5.509 |
| 5,447,332 | A * | 9/1995 | Heyring ................. | B60G 21/06 |
| | | | | 280/124.161 |
| 5,915,701 | A * | 6/1999 | Heyring ................. | B60G 21/06 |
| | | | | 280/6.154 |
| 7,751,959 | B2 * | 7/2010 | Boon ................... | B60G 21/073 |
| | | | | 251/74 |
| 7,946,599 | B2 * | 5/2011 | Lloyd ............... | B60G 17/0485 |
| | | | | 280/124.16 |
| 8,465,025 | B2 * | 6/2013 | Venton-Walters ..... | B60G 11/30 |
| | | | | 280/124.16 |
| 10,961,667 | B2 * | 3/2021 | Wiktor ................. | B60G 11/265 |
| 11,192,424 | B2 * | 12/2021 | Tabata ................. | B60G 21/073 |
| 11,465,698 | B2 * | 10/2022 | Ellifson ................. | B62D 21/11 |
| 11,529,836 | B1 * | 12/2022 | Schubart ............. | B60G 21/073 |
| 12,253,136 | B2 * | 3/2025 | Ratcliff ................. | F16F 9/0245 |
| 12,296,636 | B2 * | 5/2025 | Dwinal ................. | B60G 17/056 |
| 2003/0090080 | A1 * | 5/2003 | Trotter ................. | B60G 21/073 |
| | | | | 280/124.157 |
| 2005/0082127 | A1 * | 4/2005 | Barber .............. | B62D 33/0608 |
| | | | | 188/266.2 |
| 2012/0098216 | A1 * | 4/2012 | Ryan ................... | B60G 17/021 |
| | | | | 280/124.159 |
| 2014/0232082 | A1 * | 8/2014 | Oshita ............... | B60G 17/0162 |
| | | | | 280/124.161 |
| 2019/0337348 | A1 | 11/2019 | Venton-Walters et al. | |
| 2020/0384824 | A1 * | 12/2020 | Breazlan ............... | B60G 21/06 |
| 2021/0394576 | A1 | 12/2021 | Venton-Walters et al. | |
| 2021/0394578 | A1 * | 12/2021 | Ellifson .................. | F16F 9/28 |
| 2022/0134834 | A1 | 5/2022 | Venton-Walters et al. | |
| 2023/0070769 | A1 * | 3/2023 | Wheeler ............. | H01M 10/441 |
| 2023/0074504 | A1 * | 3/2023 | Ellifson .............. | B60G 21/005 |
| 2023/0114717 | A1 * | 4/2023 | Boon ................... | B60G 21/073 |
| | | | | 701/37 |
| 2024/0217298 | A1 | 7/2024 | Schubart et al. | |
| 2024/0253415 | A1 * | 8/2024 | Henderickx .......... | F16F 9/0472 |
| 2024/0286483 | A1 * | 8/2024 | Drach ................. | B60K 17/358 |
| 2024/0343084 | A1 | 10/2024 | Schubart et al. | |
| 2024/0359519 | A1 * | 10/2024 | Dwinal ............. | B60G 17/0162 |
| 2024/0383304 | A1 * | 11/2024 | Al Sakka ............ | B60G 21/067 |
| 2025/0010675 | A1 | 1/2025 | Ellifson et al. | |

* cited by examiner

SYSTEMS AND METHODS FOR A SUSPENSION ASSEMBLY ON A VOCATIONAL VEHICLE

CROSS-REFERENCE TO RELATED PATENT APPLICATIONS

This application claims the benefit of and priority to U.S. Provisional Patent Application No. 63/620,395, filed on Jan. 12, 2024, which is incorporated herein by reference in its entirety.

BACKGROUND

Vehicles typically include a suspension coupled between a chassis and one or more tractive elements (e.g., wheels, tracks, etc.) to absorb and/or dampen forces acting on the tractive elements.

SUMMARY

At least one embodiment relates to a suspension assembly for a vocational vehicle. The vocational vehicle includes a chassis having a frame rail. The suspension assembly includes an upper control arm, a lower control arm, a damper coupled between the lower control arm and a frame rail, and a roll control cylinder coupled between the lower control arm and the frame rail. The roll control cylinder includes a body defining an internal cavity, a piston movably arranged within internal cavity, and a rod coupled to the piston and extending outwardly from the body. The piston divides the internal cavity into a piston chamber and a rod chamber. The suspension assembly further includes an accumulator in fluid communication with the piston chamber, and a charge supply in fluid communication with the accumulator. The charge supply is configured to selectively change a charge pressure within the accumulator to adjust a roll rate or stiffness defined by the roll control cylinder.

At least one embodiment relates to a vocational vehicle. The vocational vehicle includes a chassis having a first frame rail and a second frame rail, and a suspension assembly. The suspension assembly includes an upper control arm, a lower control arm, a damper coupled between the lower control arm and the first frame rail, and a roll control cylinder coupled between the lower control arm and the first frame rail. The roll control cylinder includes a body defining an internal cavity, a piston movably arranged within internal cavity, and a rod coupled to the piston and extending outwardly from the body. The piston divides the internal cavity into a piston chamber and a rod chamber. The suspension assembly further includes an accumulator in fluid communication with the piston chamber, and a charge supply in fluid communication with the accumulator. The charge supply is configured to selectively change a charge pressure within the accumulator to adjust a roll rate or stiffness defined by the roll control cylinder.

At least one embodiment relates to a vocational vehicle. The vocational vehicle includes a chassis having a first frame rail and a second frame rail, and a suspension assembly. The suspension assembly includes a first suspension subassembly, a second suspension subassembly, and a charge supply. The first suspension subassembly includes a first roll control cylinder coupled to the first frame rail, and a first accumulator in fluid communication with the first roll control cylinder. The second suspension subassembly includes a second roll control cylinder coupled to the second frame rail, and a second accumulator in fluid communication with the second roll control cylinder. The first roll control cylinder is cross plumbed with the second roll control cylinder. The charge supply is in fluid communication with the first accumulator and the second accumulator. The charge supply is configured to selectively change a charge pressure within the accumulator to adjust a roll rate or stiffness defined by the first roll control cylinder and the second roll control cylinder.

This summary is illustrative only and is not intended to be in any way limiting. Other aspects, inventive features, and advantages of the devices or processes described herein will become apparent in the detailed description set forth herein, taken in conjunction with the accompanying figures, wherein like reference numerals refer to like elements.

BRIEF DESCRIPTION OF THE FIGURES

The disclosure will become more fully understood from the following detailed description, taken in conjunction with the accompanying figures, wherein like reference numerals refer to like elements, in which.

DETAILED DESCRIPTION

Before turning to the figures, which illustrate certain exemplary embodiments in detail, it should be understood that the present disclosure is not limited to the details or methodology set forth in the description or illustrated in the figures. It should also be understood that the terminology used herein is for the purpose of description only and should not be regarded as limiting.

The use of the terms "downstream" and "upstream" herein are terms that indicate direction relative to the flow of a fluid (e.g., liquid or gas). The term "downstream" corresponds to the direction of fluid flow, while the term "upstream" refers to the direction opposite or against the direction of fluid flow.

Vocational vehicles (e.g., a commercial vehicle, a refuse vehicle, a fire fighting vehicle, a fire suppression vehicle, a military vehicle, a mixing vehicle, a lift vehicle, a delivery vehicle, etc.) typically include a suspension system that incorporates one more mechanical stabilizer bars to aid in rollover protection. The mounting requirements for a mechanical stabilizer bar typically depend on the vehicle configuration that the stabilizer bar is being installed on, and often the size, shape, and performance characteristics of the stabilizer bar need to change to account for different vehicle configurations (e.g., engines, transmissions, axles, etc.).

The systems and methods described herein include a suspension assembly with a roll control cylinder that is hydraulically operated and in communication with an accumulator so that the roll rate or stiffness of the roll control cylinder can be dynamically adjusted. In general, the incorporation of the roll control cylinder simplifies the mounting arrangement of the suspension assembly, relative to a mechanical stabilizer bar, and enables the commonization of roll control components across various vehicle platforms.

Vehicle

Figure 1:
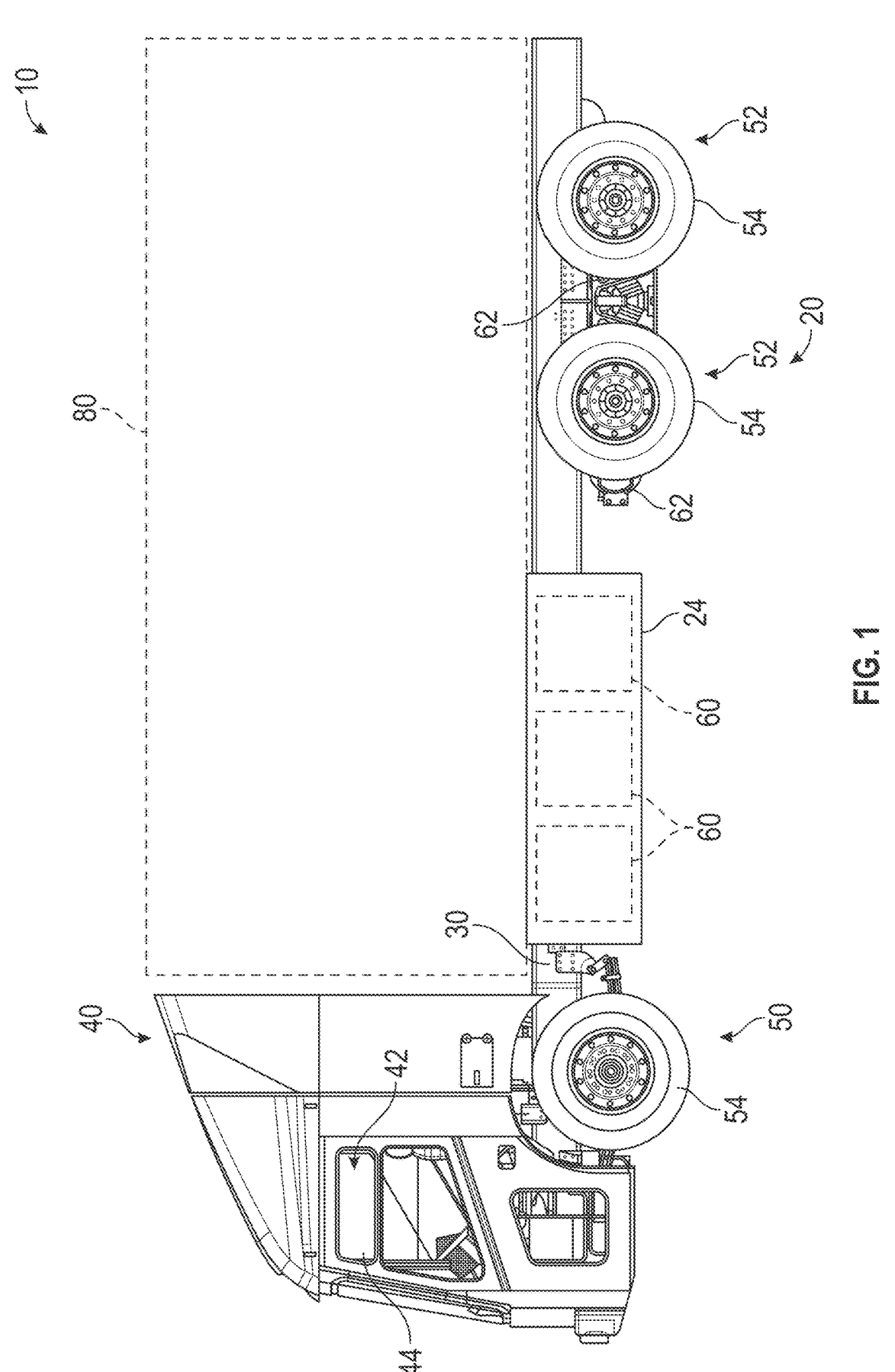
FIG. 1 is a left side view of a vehicle, according to an exemplary embodiment.

According to an exemplary embodiment, as shown in FIG. 1, a vocational vehicle (e.g., a vehicle assembly, a truck, a vehicle base, etc.), shown as vehicle 10, includes a frame assembly or chassis assembly, shown as chassis 20. The chassis assembly may support other components of the vehicle 10. In some embodiments, the chassis 20 extends longitudinally along a length of the vehicle 10. The chassis 20 may extend substantially parallel to a primary direction of travel of the vehicle 10. In some embodiments, the chassis 20 includes a middle section 24 that acts as a storage portion that includes one or more vehicle components. The middle section 24 may include an enclosure that contains one or more vehicle components and/or a frame that supports one or more vehicle components. In some embodiments, the middle section 24 contains or includes one or more electrical energy storage devices (e.g., batteries, capacitors, etc.).

According to an exemplary embodiment, a cabin, operator compartment, or body component, shown as cab 40, is coupled to a front end portion of the chassis 20 (e.g., the front section 22 of the chassis 20). Together, the chassis 20 and the cab 40 define a front end of the vehicle 10. The cab 40 extends above the chassis 20. The cab 40 includes an enclosure or main body that defines an interior volume, shown as cab interior 42 that is sized to contain one or more operators. The cab 40 also includes one or more doors 44 that facilitate selective access to the cab interior 42 from outside of the vehicle 10. The cab interior 42 contains one or more components that facilitate operation of the vehicle 10 by the operator. In one embodiment, the cab interior 42 contains components that facilitate operator comfort (e.g., seats, seatbelts, etc.), user interface components that receive inputs from the operators (e.g., steering wheels, pedals, touch screens, switches, buttons, levers, etc.), and/or user interface components that provide information to the operators (e.g., lights, gauges, speakers, etc.). The user interface components within the cab 40 may facilitate operator control over the drive components of the vehicle 10 and/or over any implements of the vehicle 10.

According to an exemplary embodiment, the vehicle 10 further includes a series of axle assemblies, shown as front axle 50 and rear axles 52. As shown, the vehicle 10 includes one front axle 50 coupled to the front section 22 of the chassis 20 and two rear axles 52 each coupled to the rear section 26 of the chassis 20. In other embodiments, the vehicle 10 includes more or fewer axles. In one embodiment, the vehicle 10 includes a tag axle that may be raised or lowered to accommodate variations in weight being carried by the vehicle 10. The front axle 50 and the rear axles 52 each include a plurality of tractive elements (e.g., wheels, treads, etc.), shown as wheel and tire assemblies 54. The wheel and tire assemblies 54 are configured to engage a support surface (e.g., roads, the ground, etc.) to support and propel the vehicle 10. The front axle 50 and the rear axles may include steering components (e.g., steering arms, steering actuators, etc.), suspension components (e.g., gas springs, dampeners, air springs, etc.), power transmission or drive components (e.g., differentials, drive shafts, etc.), braking components (e.g., brake actuators, brake pads, brake discs, brake drums, etc.), and/or other components that facilitate propulsion or support of the vehicle 10.

In some embodiments, the vehicle 10 is configured as an electric vehicle that is propelled by an electric powertrain system. As shown in FIG. 1, the vehicle 10 includes one or more electrical energy storage devices (e.g., batteries, battery packs, battery cells, capacitors, etc.), shown as batteries 60. As shown, the batteries 60 are supported on the chassis 20 (e.g., between the frame rails of the chassis 20). In other embodiments, the batteries 60 are otherwise positioned throughout the vehicle 10. The vehicle 10 further includes one or more electromagnetic devices (e.g., motor/generators), shown as drive motors 62. The drive motors 62 are electrically coupled to the batteries 60. The drive motors 62 may be configured to receive electrical energy from the batteries 60 and provide rotational mechanical energy to the wheel and tire assemblies 54 to propel the vehicle 10. The drive motors 62 may be configured to receive rotational mechanical energy from the wheel and tire assemblies 54 and provide electrical energy to the batteries 60, providing a braking force to slow the vehicle 10. As shown, the drive motors 62 are positioned within the rear axles 52 (e.g., as part of a combined axle and motor assembly). In other embodiments, the drive motors 62 are otherwise positioned within the vehicle 10 or within the axle assemblies.

In other embodiments, the vehicle 10 is configured as a hybrid vehicle that is propelled by a hybrid powertrain system (e.g., a diesel/electric hybrid, gasoline/electric hybrid, natural gas/electric hybrid, etc.). According to an exemplary embodiment, the hybrid powertrain system includes a primary driver (e.g., an engine, a motor, etc.), an energy generation device (e.g., a generator, etc.), and/or an energy storage device (e.g., a battery, capacitors, ultracapacitors, etc.) electrically coupled to the energy generation device. The primary driver may combust fuel (e.g., gasoline, diesel, etc.) to provide mechanical energy, which a transmission may receive and provide the front axle 50 and/or the rear axles 52 to propel the vehicle 10. Additionally or alternatively, the primary driver may provide mechanical energy to the generator, which converts the mechanical energy into electrical energy. The electrical energy may be stored in the energy storage device (e.g., the batteries 60) in order to later be provided to a motive driver.

In yet other embodiments, the chassis 20 is further be configured to support non-hybrid powertrains. For example, the powertrain system may include a primary driver that is a compression-ignition internal combustion engine that utilizes diesel fuel.

As shown in FIG. 1, the vehicle 10 includes a rear assembly, module, implement, body, or cargo area, shown as application kit 80. The application kit 80 may include one or more implements, vehicle bodies, and/or other components. Although the application kit 80 is shown positioned behind the cab 40, in other embodiments the application kit 80 extends forward of the cab 40. The vehicle 10 may be outfitted with a variety of different application kits 80 to configure the vehicle 10 for use in different applications. Accordingly, a common vehicle 10 can be configured for a variety of different uses simply by selecting an appropriate application kit 80. By way of example, the vehicle 10 may be configured as a refuse vehicle, a concrete mixer, a fire fighting vehicle, an airport fire fighting vehicle, a lift device (e.g., a boom lift, a scissor lift, a telehandler, a vertical lift, etc.), a crane, a tow truck, a military vehicle, a delivery vehicle, a mail vehicle, a boom truck, a plow truck, a farming machine or vehicle, a construction machine or vehicle, a coach bus, a school bus, a semi-truck, a passenger or work vehicle (e.g., a sedan, a SUV, a truck, a van, etc.), and/or still another vehicle. FIGS. 2-7 illustrate various examples of how the vehicle 10 may be configured for specific applications. Although only a certain set of vehicle configurations is shown, it should be understood that the vehicle 10 may be configured for use in other applications that are not shown.

According to an exemplary embodiment, the application kit 80 includes various actuators to facilitate certain functions of the vehicle 10. In one embodiment, the application kit 80 includes hydraulic actuators (e.g., hydraulic cylinders, hydraulic motors, etc.), pneumatic actuators (e.g., pneumatic cylinders, pneumatic motors, etc.), and/or electrical actuators (e.g., electric motors, electric linear actuators, etc.). The application kit 80 may include components that facilitate operation of and/or control of these actuators. In another embodiment, the application kit 80 includes hydraulic or pneumatic components that form a hydraulic or pneumatic circuit (e.g., conduits, valves, pumps, compressors, gauges, reservoirs, accumulators, etc.). By way of another embodiment, the application kit 80 includes electrical components (e.g., batteries, capacitors, voltage regulators, motor controllers, etc.). The actuators may be powered by components of the vehicle 10. In some embodiments, the actuators are powered by the batteries 60, the drive motors 62, or the primary driver (e.g., through a power take off).

Figure 2:
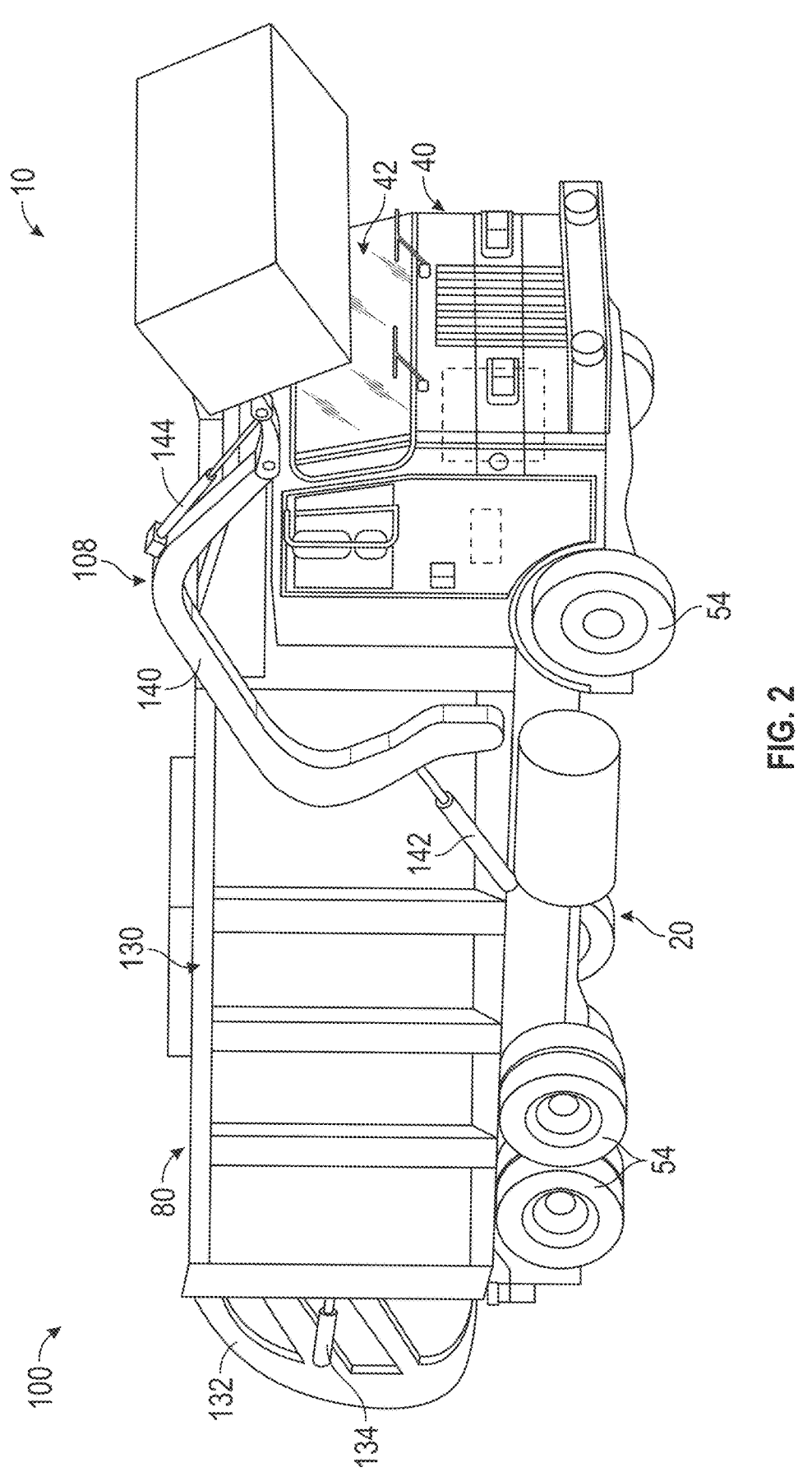
FIG. 2 is a perspective view of the vehicle of FIG. 1 configured as a refuse vehicle, according to an exemplary embodiment.

As shown in FIG. 2, the vehicle 10 is configured as a refuse vehicle 100 (e.g., a refuse truck, a garbage truck, a waste collection truck, a sanitation truck, a recycling truck, etc.). Specifically, the refuse vehicle 100 is a front-loading refuse vehicle. In other embodiments, the refuse vehicle 100 is configured as a rear-loading refuse vehicle or a side-loading refuse vehicle.

As shown in FIG. 2, the application kit 80 of the refuse vehicle 100 includes a rear body or container, shown as refuse compartment 130, and a pivotable rear portion, shown as tailgate 132. The refuse compartment 130 may facilitate transporting refuse from various waste receptacles within a municipality to a storage and/or a processing facility (e.g., a landfill, an incineration facility, a recycling facility, etc.). According to an exemplary embodiment, loose refuse is placed into the refuse compartment 130 to be compacted. The refuse compartment 130 may also provide temporary storage for refuse during transport to a waste disposal site and/or a recycling facility. In some embodiments, the refuse compartment 130 includes a hopper volume and storage volume. In this regard, refuse may be initially loaded into the hopper volume and later compacted into the storage volume. According to an exemplary embodiment, the hopper volume is positioned between the storage volume and the cab 40 (e.g., refuse is loaded into a position of the refuse compartment 130 behind the cab 40 and stored in a position further toward the rear of the refuse compartment 130). In other embodiments, the storage volume is positioned between the hopper volume and the cab 40 (e.g., in a rear-loading refuse truck, etc.). The tailgate 132 may be pivotally coupled to the refuse compartment 130, and may be movable between a closed position and an open position by an actuator (e.g., a hydraulic cylinder, an electric linear actuator, etc.), shown as tailgate actuator 134 (e.g., to facilitate emptying the storage volume).

As shown in FIG. 2, the refuse vehicle 100 also includes an implement, shown as lift assembly 108 (e.g., a front-loading lift assembly, etc.). According to an exemplary embodiment, the lift assembly 108 includes a pair of lift arms 140, lift arm actuators 142, and articulation actuators 144. The lift arms 140 may be rotatably coupled to the chassis 20. In another embodiment, the lift arms 140 are rotatably coupled to the refuse compartment 30 on each side of the refuse vehicle 100 (e.g., through a pivot, a lug, a shaft, etc.). Such an embodiment provides that the lift assembly 108 extends forward relative to the cab 40 (e.g., a front-loading refuse truck, etc.). In other embodiments, the lift assembly 108 extends rearward relative to the application kit 80 (e.g., a rear-loading refuse truck). In yet other embodiments, the lift assembly 108 extends from a side of the application kit 80 (e.g., a side-loading refuse truck). The lift arm actuators 142 are positioned such that extension and retraction of the lift arm actuators 142 rotates the lift arms 140 about an axis extending through the pivot. In this regard, the lift arms 140 may be rotated by the lift arm actuators 142 to lift a refuse container over the cab 40. In an exemplary embodiment, the articulation actuators 144 are positioned to articulate the distal end of the lift arms 140 (e.g., a portion of the lift arms 140 that may be coupled to the refuse container) in order to assist in tipping refuse out of the refuse container and into the refuse compartment 130. The lift arm actuators 142 may then rotate the lift arms 140 to return the empty refuse container to the ground.

Figure 3:
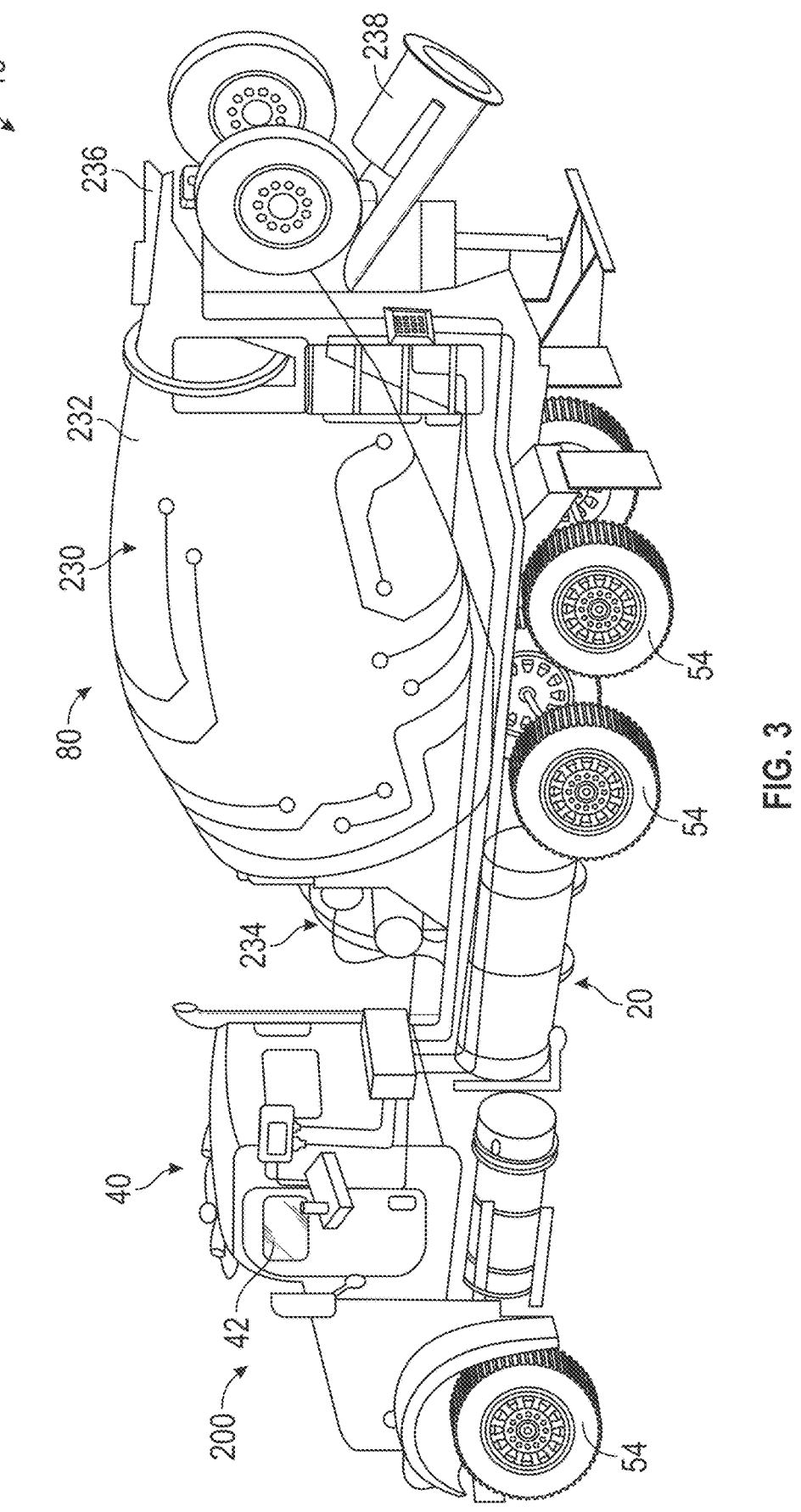
FIG. 3 is a perspective view of the vehicle of FIG. 1 configured as a mixer vehicle, according to an exemplary embodiment.

According to another exemplary embodiment, as shown in FIG. 3, the vehicle 10 is configured as a mixer truck (e.g., a concrete mixer truck, a mixer vehicle, etc.), shown as mixer truck 200. Specifically, the mixer truck 200 is a rear-discharge concrete mixer truck. In other embodiments, the mixer truck 200 is a front-discharge concrete mixer truck.

As shown in FIG. 3, the application kit 80 includes a mixing drum assembly (e.g., a concrete mixing drum), shown as drum assembly 230. The drum assembly 230 includes a mixing drum 232, a drum drive system 234 (e.g., a rotational actuator or motor), an inlet, shown as hopper 236, and an outlet, shown as chute 238. The mixing drum 232 may be coupled to the chassis 20 and may be disposed behind the cab 40 (e.g., at the rear and/or middle of the chassis 20). In an exemplary embodiment, the drum drive system 234 is coupled to the chassis 20 and configured to selectively rotate the mixing drum 232 about a central, longitudinal axis. According to an exemplary embodiment, the central, longitudinal axis of the mixing drum 232 is elevated from the chassis 20 (e.g., from a horizontal plan extending along the chassis 20) at an angle in the range of five degrees to twenty degrees. In other embodiments, the central, longitudinal axis is elevated by less than five degrees (e.g., four degrees, etc.). In yet another embodiment, the mixer truck 200 includes an actuator positioned to facilitate adjusting the central, longitudinal axis to a desired or target angle (e.g., manually in response to an operator input/command, automatically according to a control system, etc.).

The mixing drum 232 may be configured to receive a mixture, such as a concrete mixture (e.g., cementitious material, aggregate, sand, etc.), through the hopper 236. In some embodiments, the mixer truck 200 includes an injection system (e.g., a series of nozzles, hoses, and/or valves). The injection system may include an injection valve that selectively fluidly couples a supply of fluid to the inner volume of the mixing drum 232. In one embodiment, the injection system is used to inject water and/or chemicals (e.g., air entrainers, water reducers, set retarders, set accelerators, superplasticizers, corrosion inhibitors, coloring, calcium chloride, minerals, and/or other concrete additives, etc.) into the mixing drum 232. The injection valve may facilitate injecting water and/or chemicals from a fluid reservoir (e.g., a water tank, etc.) into the mixing drum 232, while preventing the mixture in the mixing drum 232 from exiting the mixing drum 232 through the injection system. In some embodiments, one or more mixing elements (e.g., fins, etc.) are positioned in the interior of the mixing drum 232, and may be configured to agitate the contents of the mixture when the mixing drum 232 is rotated in a first direction (e.g., counterclockwise, clockwise, etc.), and drive the mixture out through the chute 238 when the mixing drum 232 is rotated in a second direction (e.g., clockwise, counterclockwise, etc.). In some embodiments, the chute 238 includes an actuator positioned such that the chute 238 may be selectively pivotable to position the chute 238 (e.g., vertically, laterally, etc.), for example, at an angle at which the mixture is expelled from the mixing drum 232.

Figure 4:
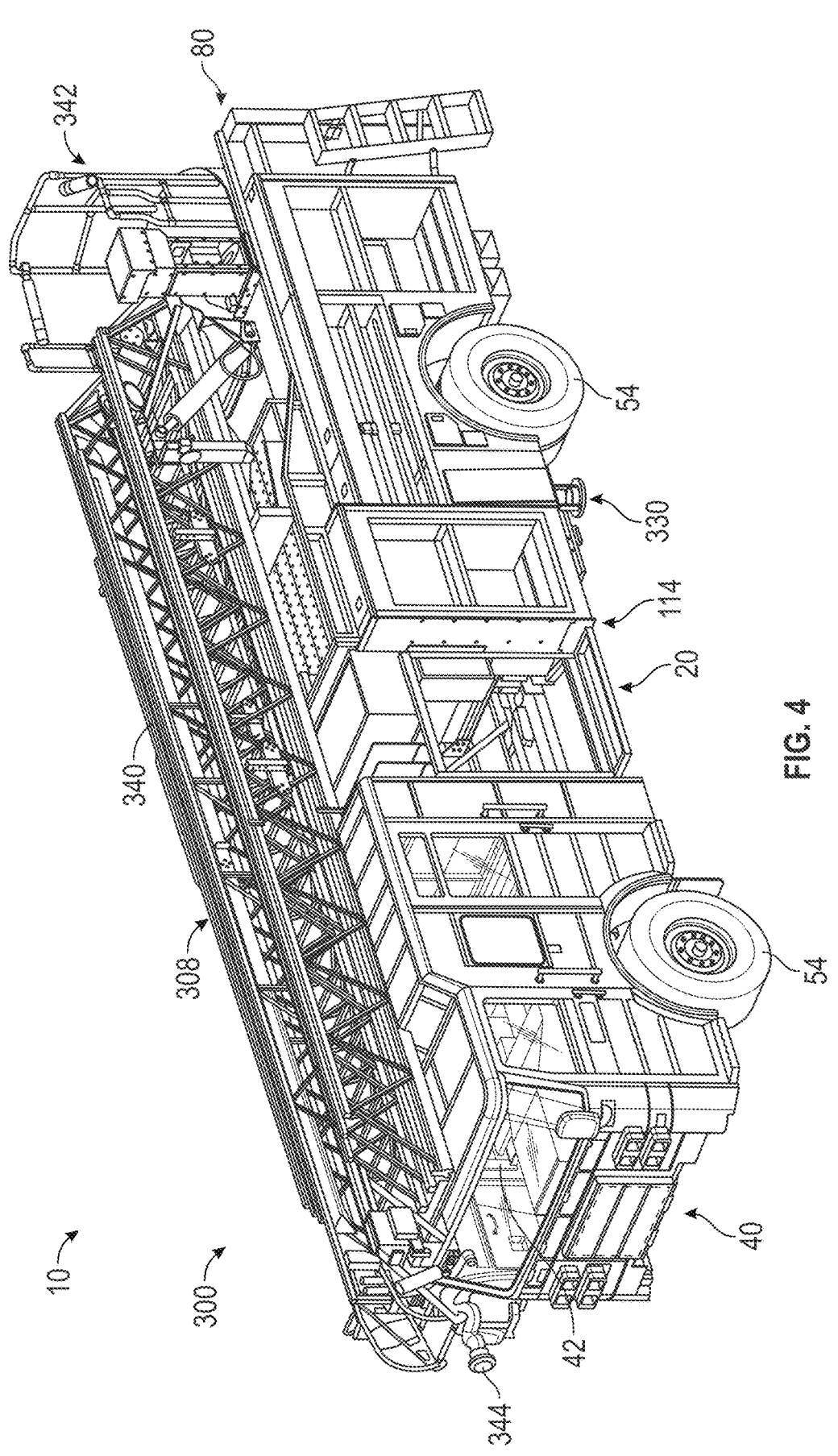
FIG. 4 is a perspective view of the vehicle of FIG. 1 configured as a fire fighting vehicle, according to an exemplary embodiment.

As shown in FIG. 4, the vehicle 10 is configured as a fire fighting vehicle or fire apparatus (e.g., a turntable ladder truck, a pumper truck, a quint, etc.), shown as fire fighting vehicle 300. As shown in FIG. 4, the fire fighting vehicle 300 is configured as a rear-mount aerial ladder truck. In other embodiments, the fire fighting vehicle 300 is configured as a mid-mount aerial ladder truck, a quint fire truck (e.g., including an on-board water storage, a hose storage, a water pump, etc.), a tiller fire truck, a pumper truck (e.g., without an aerial ladder), or another type of response vehicle. According to an exemplary embodiment, the vehicle 10 is be configured as a police vehicle, an ambulance, a tow truck, or still other vehicles used for responding to a scene (e.g., an accident, a fire, an incident, etc.).

As shown in FIG. 4, in the fire fighting vehicle 300, the application kit 80 is positioned mainly rearward from the cab 40. The application kit 80 includes deployable stabilizers (e.g., outriggers, downriggers, etc.), shown as outriggers 330, that are coupled to the chassis 20. The outriggers 330 may be configured to selectively extend from each lateral side and/or the rear of the fire fighting vehicle 300 and engage a support surface (e.g., the ground) in order to provide increased stability while the fire fighting vehicle 300 is stationary. This increased stability is desirable when the ladder assembly 308 is in use (e.g., extended from the fire fighting vehicle 300) to prevent tipping. In some embodiments, the application kit 80 further includes various storage compartments (e.g., cabinets, lockers, etc.) that are selectively opened and/or accessed for storage and/or component inspection, maintenance, and/or replacement.

As shown in FIG. 4, the application kit 80 includes a ladder assembly 308 coupled to the chassis 20. The ladder assembly 308 includes a series of ladder sections 340 that are slidably coupled with one another such that the ladder sections 340 may extend and/or retract (e.g., telescope) relative to one another to selectively vary a length of the ladder assembly 308. A base platform, shown as turntable 342, is rotatably coupled to the chassis 20 and to a proximal end of a base ladder section 340 (i.e., the most proximal of the ladder sections 340). The turntable 342 may be configured to rotate about a vertical axis relative to the chassis 20 to rotate the ladder sections 340 about the vertical axis (e.g., up to 360 degrees, etc.). The ladder sections 340 may rotate relative to the turntable 342 about a substantially horizontal axis to selectively raise and lower the ladder sections 340 relative to the chassis 20. As shown, a water turret or implement, shown as monitor 344, is coupled to a distal end of a fly ladder section 340 (i.e., the most distal of the ladder sections 340). The monitor 344 may be configured to expel water and/or a fire suppressing agent (e.g., foam, etc.) from a water storage tank and/or an agent tank onboard the fire fighting vehicle 300, and/or from an external source (e.g., a fire hydrant, a separate water/pumper truck, etc.). In some embodiments, the ladder assembly 308 further includes an aerial platform coupled to the distal end of the fly ladder section 340 and configured to support one or more operators.

Figure 5:
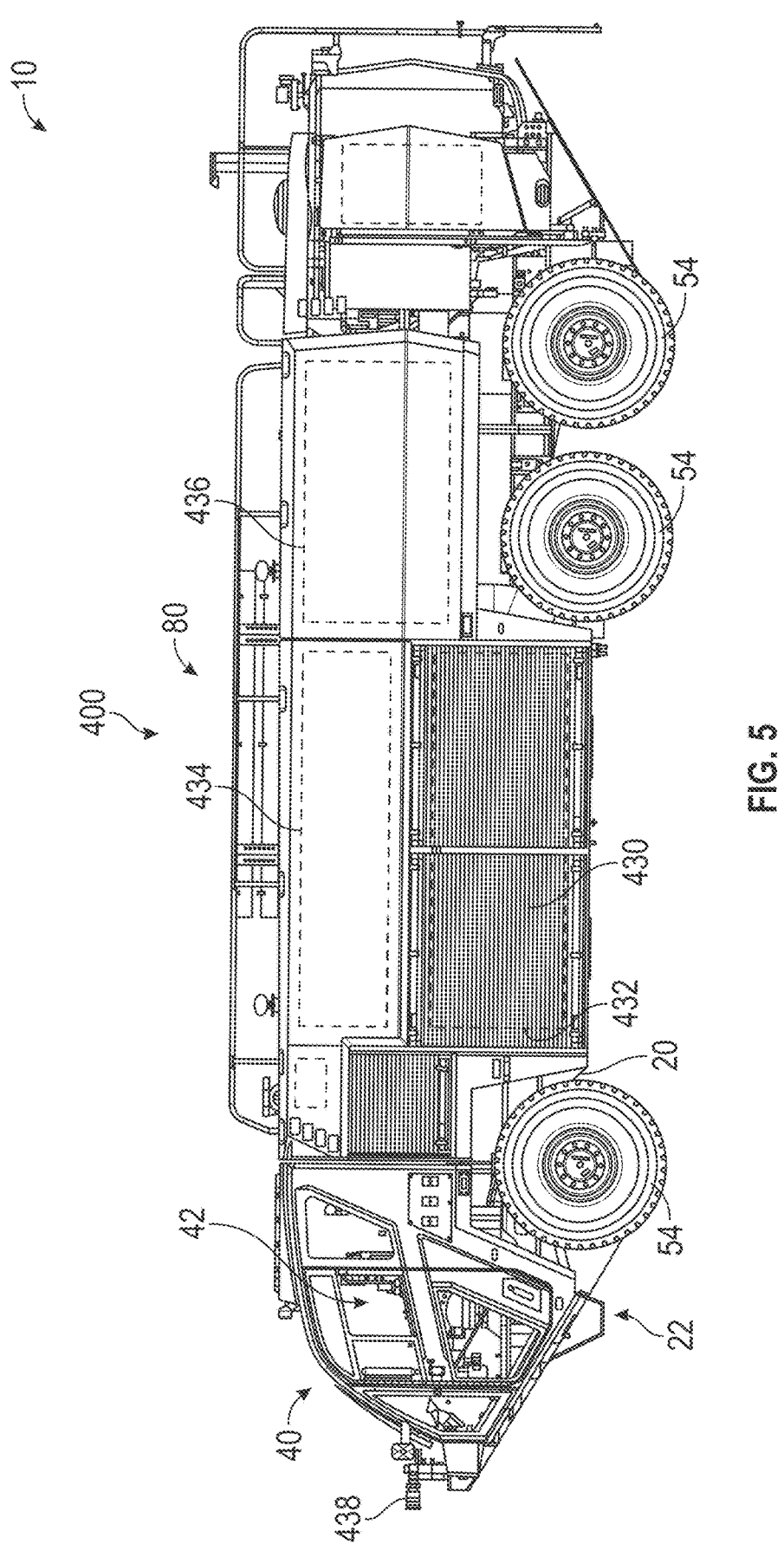
FIG. 5 is a left side view of the vehicle of FIG. 1 configured as an airport fire fighting vehicle, according to an exemplary embodiment.

According to another exemplary embodiment, as shown in FIG. 5, the vehicle 10 is configured as a fire fighting vehicle, shown as airport rescue and fire fighting (ARFF) truck 400. As shown in FIG. 5, the application kit 80 is positioned primarily rearward of the cab 40. As shown, the application kit 80 includes a series of storage compartments or cabinets, shown as compartments 430, that are coupled to the chassis 20. The compartments 430 may store various equipment or components of the ARFF truck 400.

The application kit 80, as shown in FIG. 5, includes a pump system 432 (e.g., an ultra-high-pressure pump system, etc.) positioned within one of the compartments 430 near the center of the ARFF truck 400. The application kit 80 further includes a water tank 434, an agent tank 436, and an implement or water turret, shown as monitor 438. The pump system 432 may include a high pressure pump and/or a low pressure pump, which may be fluidly coupled to the water tank 434 and/or the agent tank 436. The pump system 432 may to pump water and/or fire suppressing agent from the water tank 434 and the agent tank 436, respectively, to the monitor 438. The monitor 438 may be selectively reoriented by an operator to adjust a direction of a stream of water and/or agent. As shown in FIG. 5, the monitor 438 is coupled to a front end of the cab 40.

Figure 6:
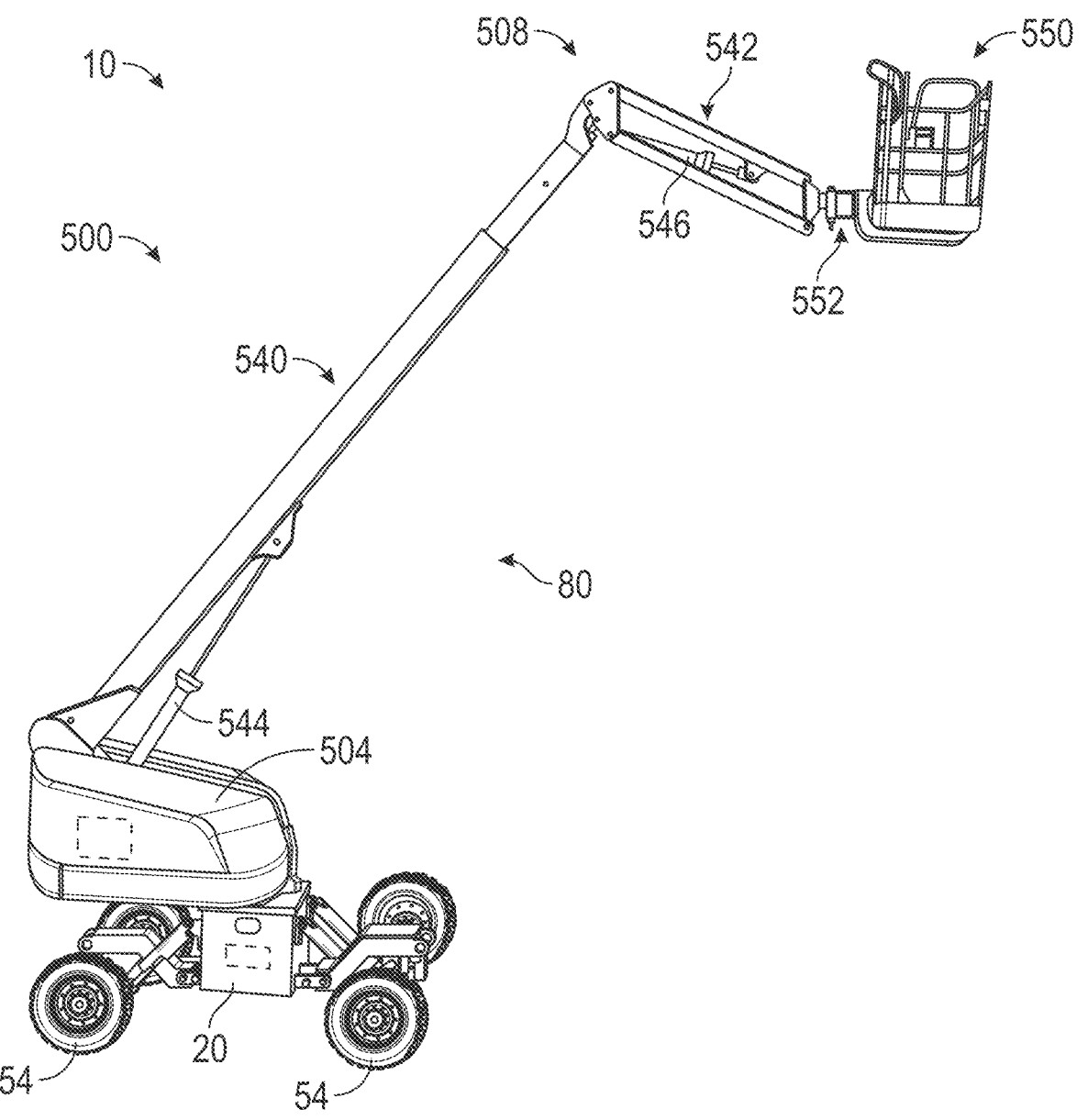
FIG. 6 is a perspective view of the vehicle of FIG. 1 configured as a boom lift, according to an exemplary embodiment.

As shown in FIG. 6, the vehicle 10 is configured as a lift device, shown as boom lift 500. The boom lift 500 may be configured to support and elevate one or more operators. In other embodiments, the vehicle 10 is configured as another type of lift device that is configured to lift operators and/or material, such as a skid-loader, a telehandler, a scissor lift, a fork lift, a vertical lift, and/or any other type of lift device or machine.

As shown in FIG. 6, the application kit 80 includes a base assembly, shown as turntable 504 that is rotatably coupled to the chassis 20. The turntable 504 may be configured to selectively rotate relative to the chassis 20 about a substantially vertical axis. In some embodiments, the turntable 504 includes a counterweight positioned near the rear of the turntable 504. The turntable 504 is rotatably coupled to a lift assembly, shown as boom assembly 508. The boom assembly 508 includes a first section or telescoping boom section, shown as lower boom 540. The lower boom 540 includes a series of nested boom sections that extend and retract (e.g., telescope) relative to one another to vary a length of the boom assembly 508. The boom assembly 508 further includes a second boom section or four bar linkage, shown as upper boom 542. The upper boom 542 may include structural members that rotate relative to one another to raise and lower a distal end of the boom assembly 508. In other embodiments, the boom assembly 508 includes more or fewer boom sections (e.g., one, three, five, etc.) and/or a different arrangement of boom sections.

As shown in FIG. 6, the boom assembly 508 includes a first actuator, shown as lower lift cylinder 544. The lower boom 540 is pivotally coupled (e.g., pinned, etc.) to the turntable 504 at a joint or lower boom pivot point. The lower lift cylinder 544 (e.g., a pneumatic cylinder, an electric actuator, a hydraulic cylinder, etc.) is coupled to the turntable 504 at a first end and coupled to the lower boom 540 at a second end. The lower lift cylinder 544 may be configured to raise and lower the lower boom 540 relative to the turntable 504 about the lower boom pivot point.

The boom assembly 508 further includes a second actuator, shown as upper lift cylinder 546. The upper boom 542 is pivotally coupled (e.g., pinned) to the upper end of the lower boom 540 at a joint or upper boom pivot point. The upper lift cylinder 546 (e.g., a pneumatic cylinder, an electric actuator, a hydraulic cylinder, etc.) is coupled to the upper boom 542. The upper lift cylinder 546 may be configured to extend and retract to actuate (e.g., lift, rotate, elevate, etc.) the upper boom 542, thereby raising and lowering a distal end of the upper boom 542.

As shown in FIG. 6, the application kit 80 further includes an operator platform, shown as platform assembly 550, coupled to the distal end of the upper boom 542 by an extension arm, shown as jib arm 552. The jib arm 552 may be configured to pivot the platform assembly 550 about a lateral axis (e.g., to move the platform assembly 550 up and down, etc.) and/or about a vertical axis (e.g., to move the platform assembly 550 left and right, etc.).

According to an exemplary embodiment, the platform assembly 550 provides a platform configured to support one or more operators or users. In some embodiments, the platform assembly 550 includes accessories or tools configured for use by the operators. In one embodiment, the platform assembly 550 includes pneumatic tools (e.g., an impact wrench, airbrush, nail gun, ratchet, etc.), plasma cutters, welders, spotlights, etc. In other embodiments, the platform assembly 550 includes a control panel (e.g., a user interface, a removable or detachable control panel, etc.) configured to control operation of the boom lift 500 (e.g., the turntable 504, the boom assembly 508, etc.) from the platform assembly 550 or remotely. In other embodiments, the platform assembly 550 is omitted, and the boom lift 500 includes an accessory and/or tool (e.g., forklift forks, etc.) coupled to the distal end of the boom assembly 508.

Figure 7:
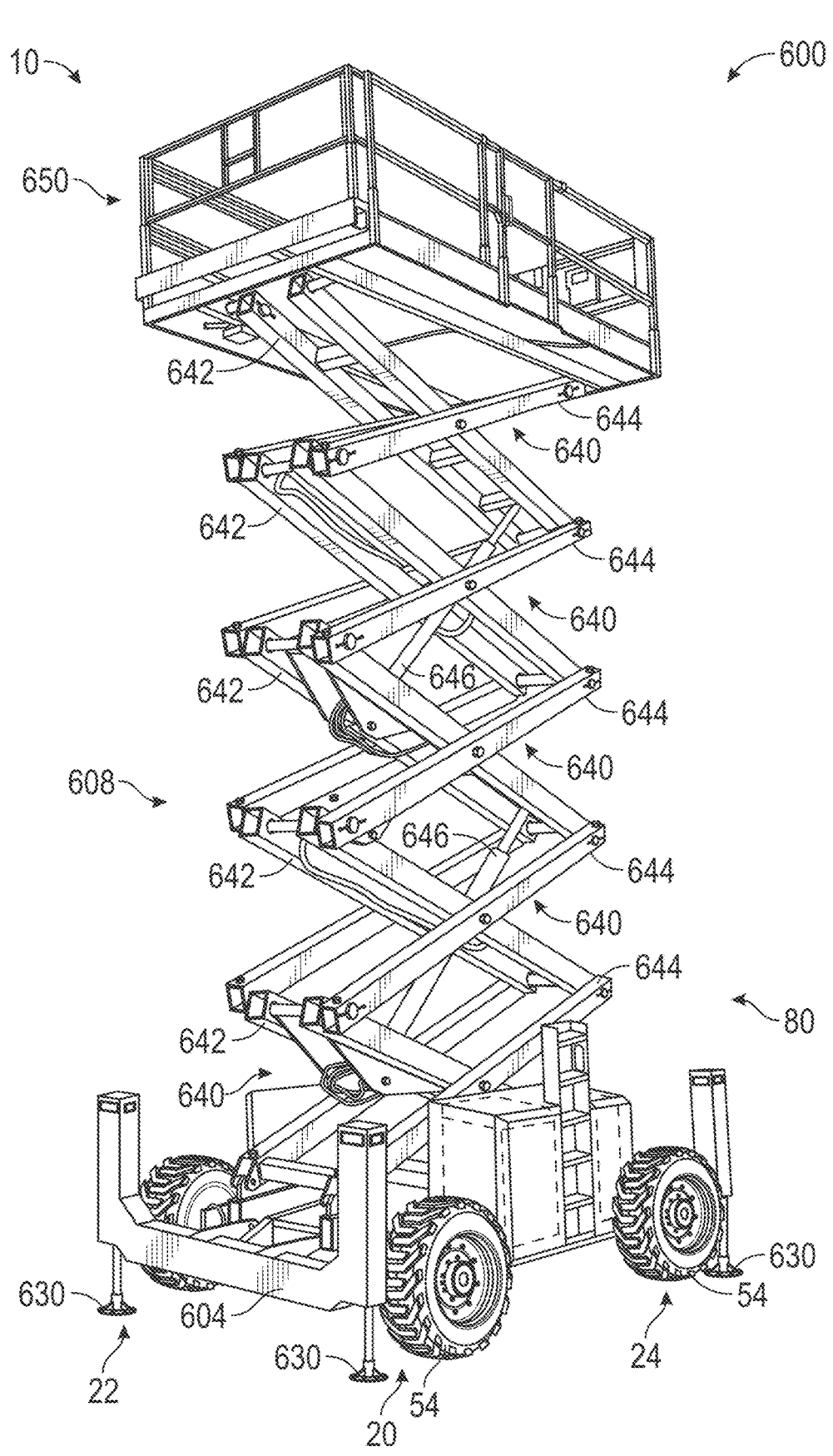
FIG. 7 is a perspective view of the vehicle of FIG. 1 configured as a scissor lift, according to an exemplary embodiment.

According to an exemplary embodiment, as shown in FIG. 7, the vehicle 10 is configured as a lift device, shown as scissor lift 600. As shown in FIG. 7, the application kit 80 includes a body, shown as lift base 604, coupled to the chassis 20. The lift base 604 is coupled to a scissor assembly, shown as lift assembly 608, such that the lift base 604 supports the lift assembly 608. The lift assembly 608 is configured to extend and retract, raising and lowering between a raised position and a lowered position relative to the lift base 604.

As shown in FIG. 7, the lift base 604 includes a series of actuators, stabilizers, downriggers, or outriggers, shown as leveling actuators 630. The leveling actuators 630 may extend and retract vertically between a stored position and a deployed position. In the stored position, the leveling actuators 630 may be raised, such that the leveling actuators 630 do not contact the ground. Conversely, in the deployed position, the leveling actuators 630 may engage the ground to lift the base assembly 604. The length of each of the leveling actuators 630 in their respective deployed positions may be varied in order to adjust the pitch (e.g., rotational position about a lateral axis) and the roll (e.g., rotational position about a longitudinal axis) of the base assembly 604 and/or the chassis 20. Accordingly, the lengths of the leveling actuators 630 in their respective deployed positions may be adjusted to level the base assembly 604 with respect to the direction of gravity (e.g., on uneven, sloped, pitted, etc. terrain). The leveling actuators 630 may lift the wheel and tire assemblies 54 off of the ground to prevent movement of the scissor lift 600 during operation. In other embodiments, the leveling actuators 630 are omitted.

According to an exemplary embodiment, the lift assembly 608 includes a series of subassemblies, shown as scissor layers 640, each including a pair of inner members 642 and a pair of outer members 644. The scissor layers 640 may be stacked atop one another in order to form the lift assembly 608. The inner members 642 may be pivotally coupled to the outer members 644 near the center of both the inner members 642 and the outer members 644. In this regard, the inner members 642 may pivot relative to the outer members 644 about a lateral axis. Each of the inner members 642 and the outer members 644 may include a top end and a bottom end. The bottom end of each inner member 642 may be pivotally coupled to the top end of the outer member 644 immediately below it, and the bottom end of each outer member 644 may be pivotally coupled to the top end of the inner member immediately below it. Accordingly, each of the scissor layers 640 may be coupled to one another such that movement of one scissor layer 640 causes a similar movement in all of the other scissor layers 640. The bottom ends of the inner member 642 and the outer member 644 that make up the lowermost scissor layer 640 may be coupled to the base assembly 604. The top beds of the inner member 642 and the outer member 644 that make up the uppermost scissor layer 640 may be coupled to the platform assembly 650. In some embodiments, scissor layers 640 may be added to, or removed from, the lift assembly 608 in order to increase, or decrease, the fully extended height of the lift assembly 608.

As shown in FIG. 7, the lift assembly 608 also includes one or more lift actuators 646 (e.g., hydraulic cylinders, pneumatic cylinders, motor-driven leadscrews, etc.) configured to extend and retract the lift assembly 608. The lift actuators 646 may be pivotally coupled to an inner member 642 at a fist end and pivotally coupled to an inner member 642 of another scissor layer 640 at a second end. In an exemplary embodiment, these inner members 642 belong to a first scissor layer 640 and a second scissor layer 640 (which may be separated by a third scissor layer 640). In other embodiments, the lift actuators 646 are arranged in other configurations (e.g., the first scissor layer 640 and the second scissor layer 640 are not separated by a third scissor layer 640, etc.).

According to an exemplary embodiment, as distal or upper end of the lift assembly 608 is coupled to an operator platform, shown as platform assembly 650. The lift actuators 646 may be configured to actuate the lift assembly 608 to selectively reposition the platform assembly 650 between a lowered position (e.g., where the platform assembly 650 is proximate to the lift base 604) and a raised position (e.g., where the platform assembly 650 is at an elevated height relative to the lift base 604). Specifically, in some embodiments, extension of the lift actuators 646 moves the platform assembly 650 upward (e.g., extending the lift assembly 608), and retraction of the lift actuators 646 moves the platform assembly 650 downward (e.g., retracting the lift assembly 608). In other embodiments, extension of the lift actuators 646 retracts the lift assembly 608, and retraction of the lift actuators 646 extends the lift assembly 608. In some embodiments, the outer members 644 are parallel to and/or in contact with one another when the lift assembly 608 is in the stored position.

In some embodiments, the platform assembly 650 includes a platform that is configured to support one or more operators or users. Similar to the platform assembly 550, the platform assembly 650 may include accessories or tools (e.g., pneumatic tools, plasma cutters, welders, spotlights, etc.) configured for use by an operator. The platform assembly 650 may include a control panel to control operation of the scissor lift 600.

Suspension Assembly

Figure 8:
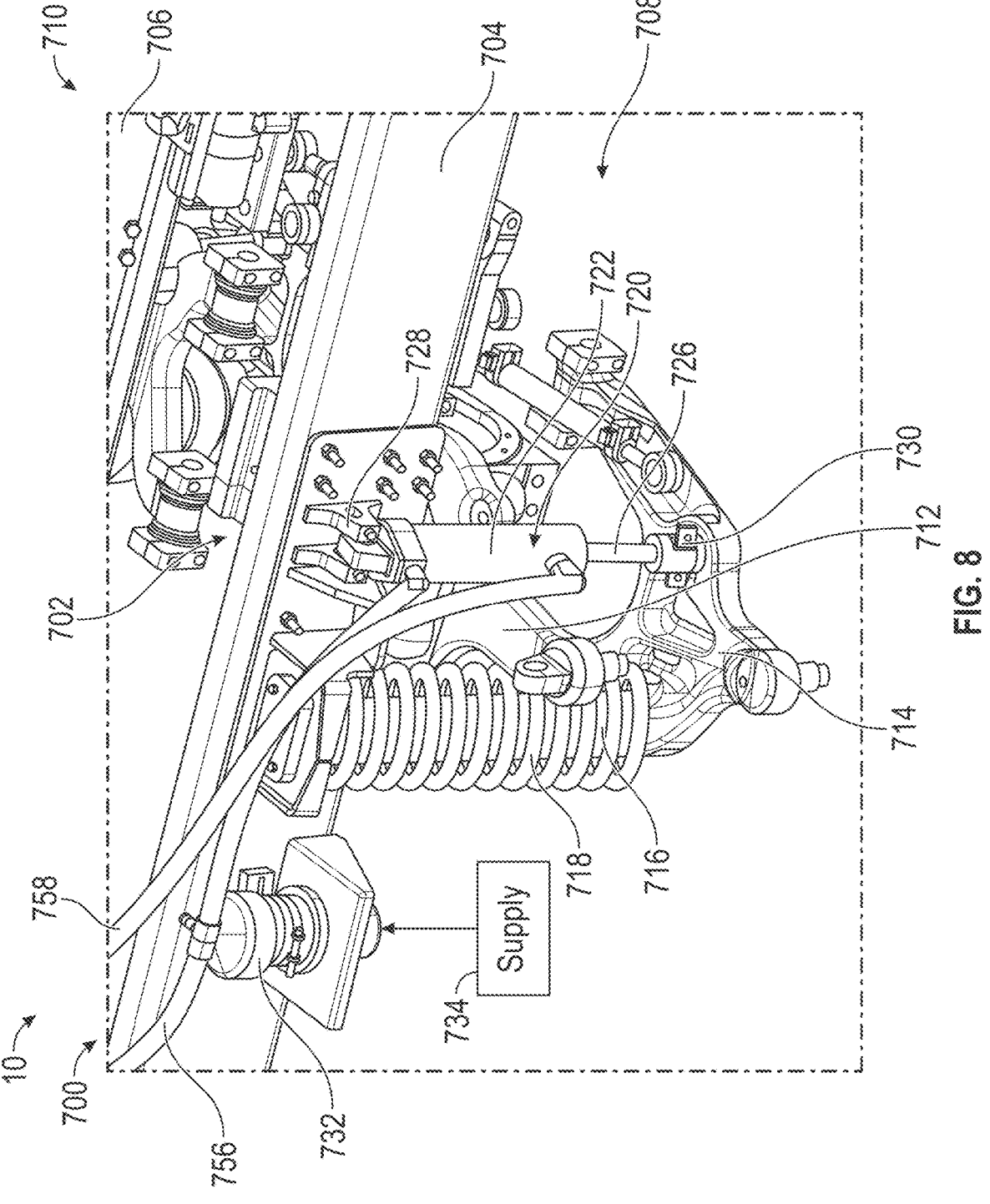
FIG. 8 is a perspective view of a suspension assembly of a vehicle, according to an exemplary embodiment.
Figure 9:
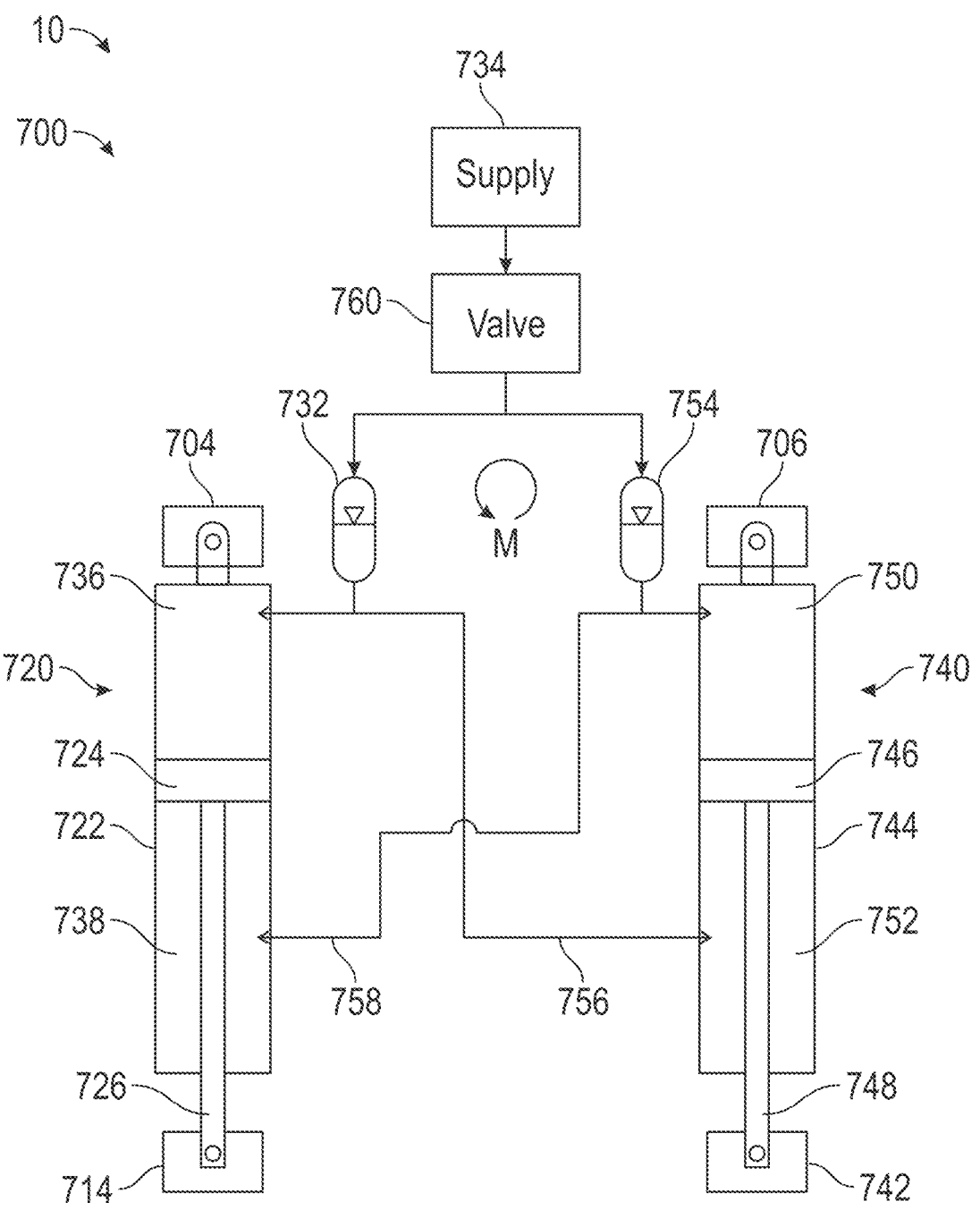
FIG. 9 is a schematic illustration of the suspension assembly of FIG. 8, according to an exemplary embodiment.

FIGS. 8 and 9 illustrate a suspension assembly 700 for a vocational vehicle (e.g., a commercial vehicle, a refuse vehicle, a fire fighting vehicle, a fire suppression vehicle, a military vehicle, a mixing vehicle, a lift vehicle, a delivery vehicle etc.). In some embodiments, the suspension assembly 700 is included on any configuration of the vehicle 10 described herein. In general, the suspension assembly 700 is coupled between the chassis 20 and one or more axles 702 (e.g., the front axle 50 and/or the rear axle 52). In some embodiments, the chassis 20 includes a pair of frame portions, frame members, or frame rails, shown as a first frame rail 704 and a second frame rail 706. The first frame rail 704 is laterally separated from the second frame rail 706, which provides frame stiffness and space for vehicle components (e.g., batteries, motors, axles, gears, etc.) between the first frame rail 704 and the second frame rail 706. The first frame rail 704 and the second frame rail 706 both extend longitudinally and parallel to one another (e.g., parallel to a central longitudinal axis defined by the vehicle 10) and along a length of the vehicle 10. In some embodiments, the first frame rail 704 and the second frame rail 706 both define a C-shaped cross-section, for example, taken along an axis parallel to a lateral axis defined by the vehicle 10. In some embodiments, the first frame rail 704 and the second frame rail 706 define other shapes (e.g., I-beams, rectangular beams, etc.).

In general, the suspension assembly 700 includes a first subassembly 708 coupled to the first frame rail 704 and a second subassembly 710 coupled to the second frame rail 706. The design, arrangement, and properties of the first subassembly 708 are similar to the second subassembly 710. Accordingly, any description and illustration herein of the first subassembly 708 (e.g., with reference to FIG. 8) applies similarly to the second subassembly 710.

With specific reference to FIG. 8, the first subassembly 708 includes an upper control arm 712, a lower control arm 714, a damper 716, a spring 718, and a roll control cylinder 720. The upper control arm 712 and the lower control arm 714 are both coupled between the axle 702 and a tractive element (e.g., one of the tractive elements 54). The damper 716 is coupled between the lower control arm 714 and the first frame rail 704. In some embodiments, the damper 716 is in the form of a hydraulic cylinder including an internal valve or orifice that regulates a damping force provided by the damper 716. The spring 718 is coupled between the lower control arm 714 and the first frame rail 704. In the illustrated embodiment, the damper 716 extends through an internal passaged defined by the spring 718. In other words, the spring 718 is wrapped around the damper 716 so that the damper 716 and the spring 718 extend coaxially. In some embodiments, the damper 716 and the spring 718 are coupled between the lower control arm 714 and the first frame rail 704 in a nonconcentric arrangement.

In some embodiments, the roll control cylinder 720 is a double-acting cylinder where the areas of the piston faces are not equal. In general, the roll control cylinder 720 is coupled between the lower control arm 714 and the first frame rail 704, and a roll rate or stiffness defined by the roll control cylinder 720 is configured to be controlled and/or adjusted to determine an amount of roll allowed by the suspension assembly 700. The roll control cylinder 720 includes a body 722 (e.g., a cylindrical body), a piston 724 (see, e.g., FIG. 9), and a rod 726 coupled to the piston 724 and extending outwardly from the body 722. In the illustrated embodiment, an end of the body 722 is pivotally coupled to the first frame rail 704 by a body bracket 728. In some embodiments, a pin is inserted through the end of the body 722 and the body bracket 728 to allow the roll control cylinder 720 to pivot relative to the first frame rail 704. In the illustrated embodiment, an end of the rod 726 is pivotally coupled to the lower control arm 714 by a rod bracket 730. In some embodiments, a pin is inserted through the end of the rod 726 and the rod bracket 730 to allow the roll control cylinder 720 to pivot relative to the lower control arm 714.

The first subassembly 708 includes an accumulator 732 that is in fluid communication with the roll control cylinder 720. In the illustrated embodiment, the accumulator 732 is coupled to the first frame rail 704 (e.g., to a laterally-outer surface of the first frame rail 704). A charge supply 734 is in fluid communication with the accumulator 732. In some embodiments, the charge supply 734 is in the form of a pump. In some embodiments, the charge supply 734 is in the form of a pressurized tank. In some embodiments, the charge supply 734 is supported on the chassis 20 or otherwise coupled to the vehicle 10. In general, the charge supply 734 is configured to supply pressurized fluid (e.g., nitrogen gas) to the accumulator 732 to adjust a roll rate or stiffness (e.g., an amount of torque per rotation, such as degrees or radians, about a roll axis of the vehicle 10) defined by the roll control cylinder 720.

Turning to FIG. 9, the body 722 defines an internal cavity and the piston 724, which is movably arranged within the internal cavity, divides the internal cavity into a piston chamber 736 and a rod chamber 738. The accumulator 732 is in fluid communication with the piston chamber 736 of the roll control cylinder 720.

Similar to the first subassembly 708, the second subassembly 710 includes a roll control cylinder 740. The roll control cylinder 740 is coupled between a lower control arm 742 of the second subassembly 710 and the second frame rail 706. In general, the roll control cylinder 740 (e.g., the second roll control cylinder 740) includes similar components as the roll control cylinder 720 (e.g., the first roll control cylinder 720). The second roll control cylinder 740 includes a body 744 (e.g., a cylindrical body), a piston 746, and a rod 748 coupled to the piston 746 and extending outwardly from the body 744. An end of the body 744 is pivotally coupled to the second frame rail 706 (e.g., in a similar way as the body 722 is pivotally coupled to the first frame rail 704). An end of the rod 748 is pivotally coupled to the lower control arm 742 (e.g., in a similar way as the rod 726 is pivotally coupled to the lower control arm 714).

The piston 746 divides an internal cavity of the body 744, which the piston 746 is movably arranged within, into a piston chamber 750 and a rod chamber 752. An accumulator 754 of the second subassembly 710 is in fluid communication with the piston chamber 750 of the second roll control cylinder 740. Like the accumulator 732 (e.g., the first accumulator 732), the accumulator 754 (e.g., the second accumulator 754) is configured to receive pressurized fluid from the charge supply 734 to adjust a roll rate or stiffness of the second roll control cylinder 740.

The first roll control cylinder 720 is in fluid communication with the second roll control cylinder 740 so that a closed circuit is formed. For example, the first roll control cylinder 720 is cross plumbed to the second roll control cylinder 740. That is, the piston chamber 736 of the first roll control cylinder 720 is in fluid communication with the rod chamber 752 of the second roll control cylinder 740 via a first conduit or hose 756, and the piston chamber 750 of the second roll control cylinder 740 is in fluid communication with the rod chamber 738 of the first roll control cylinder 720 via a second conduit or hose 758.

In general, the first roll control cylinder 720 and the second roll control cylinder 740 combine to provide roll control to the vehicle 10. For example, if the first frame rail 704 is oriented on a left side of the vehicle 10 and the vehicle 10 makes a left turn or bank, the inertia of the vehicle 10 generates a moment M (i.e., roll) that acts to compress the first roll control cylinder 720, which applies a force the urges the rod 726 and the piston 724 further into the body 722 (e.g., upward from the perspective of FIG. 9), and to expand the second roll control cylinder 740, which applies a force that urges the rod 748 and the piston 746 further out of the body 722 (e.g., downward from the perspective of FIG. 9). Accordingly, the piston chamber 736 of the first roll control cylinder 720 and the rod chamber 752 of the second roll control cylinder 740 are compressed, which forces fluid (e.g., oil) into the first accumulator 732 and compresses the first accumulator 732. The compression of the first accumulator 732 increases the pressure in the first conduit 756 (and the piston chamber 736 and the rod chamber 752). The rod chamber 738 of the first roll control cylinder 720 and the piston chamber 750 of the second roll control cylinder 740 are expanded, which draws fluid out of the second accumulator 754 and the pressure decreases in the second conduit 758 (and the rod chamber 738 and the piston chamber 750).

With the pressure increasing in the first conduit 756 and decreasing in the second conduit 758, the first roll control cylinder 720 and the second roll control cylinder 740 combine to generate a torque or moment that opposes the moment M resulting from the turn and reduces the amount of roll experienced by the suspension assembly 700 and/or the vehicle 10. Specifically, as a result of the turn, the pressure within the piston chamber 736 increases and the pressure within the rod chamber 738 decreases, so a pressure differential is generated across the piston 724 that counteracts the compression of the first roll control cylinder 720 and the moment M is counteracted, which reduces or controls the roll of the vehicle 10.

In the illustrated embodiment, a valve 760 is arranged between the charge supply 734 and both the first accumulator 732 and the second accumulator 754. In general, the valve 760 is configured to selectively provide fluid communication between the charge supply 734 and both the first accumulator 732 and the second accumulator 754 to adjust the charge pressure of the first accumulator 732 and the second accumulator 754. In some embodiments, the valve 760 is a 2-position valve, or a 3-position valve. In some embodiments, the valve 760 is a bi-stable (e.g., on-off) valve, or a proportional valve. In some embodiments, the valve 760 is a pneumatically-controlled valve, an electrically controlled valve, or an electro-pneumatic valve. In some embodiments, the valve 760 includes a solenoid or electromagnetic actuator that controls the actuation of the valve 760 (e.g., bi-stable or proportional). In some embodiments, the valve 760 includes a bleed port in fluid communication with the atmosphere that is configured to bleed or drain the charge pressure from the first accumulator 732 and the second accumulator 754, when placed in fluid communication with the first accumulator 732 and the second accumulator 754. In some embodiments, the first accumulator 732 and the second accumulator 754 both include an integrated bleed valve or orifice that is electrically, electromechanically, or electro-pneumatically controlled to selective bleed or drain charge pressure from the first accumulator 732 and the second accumulator 754.

In some embodiments, the valve 760 is configured to selectively increase or decrease the charge pressure within both the first accumulator 732 and the second accumulator 754 to adjust a roll rate or stiffness of the suspension assembly 700 (e.g., a stiffness or roll rate defined by the first roll control cylinder 720 and the second roll control cylinder 740). For example, the valve 760 may selectively connect the charge supply 734, which is at a higher pressure than the charge pressure within the first accumulator 732 and the second accumulator 754, to the first accumulator 732 and the second accumulator 754 to increase the charge pressure of the first accumulator 732 and the second accumulator 754, which increases a stiffness of the suspension assembly 700. The valve 760 may also selectively connect the first accumulator 732 and the second accumulator 754 to the drain or bleed port to decrease the charge pressure of the first accumulator 732 and the second accumulator 754, which decreases a stiffness of the suspension assembly 700. In some embodiments, an integrated bleed or drain valve within the first accumulator 732 and the second accumulator 754 may selectively decrease the charge pressure, rather than the valve 760, and the valve 760 may selectively increase the charge pressure.

Figure 10:
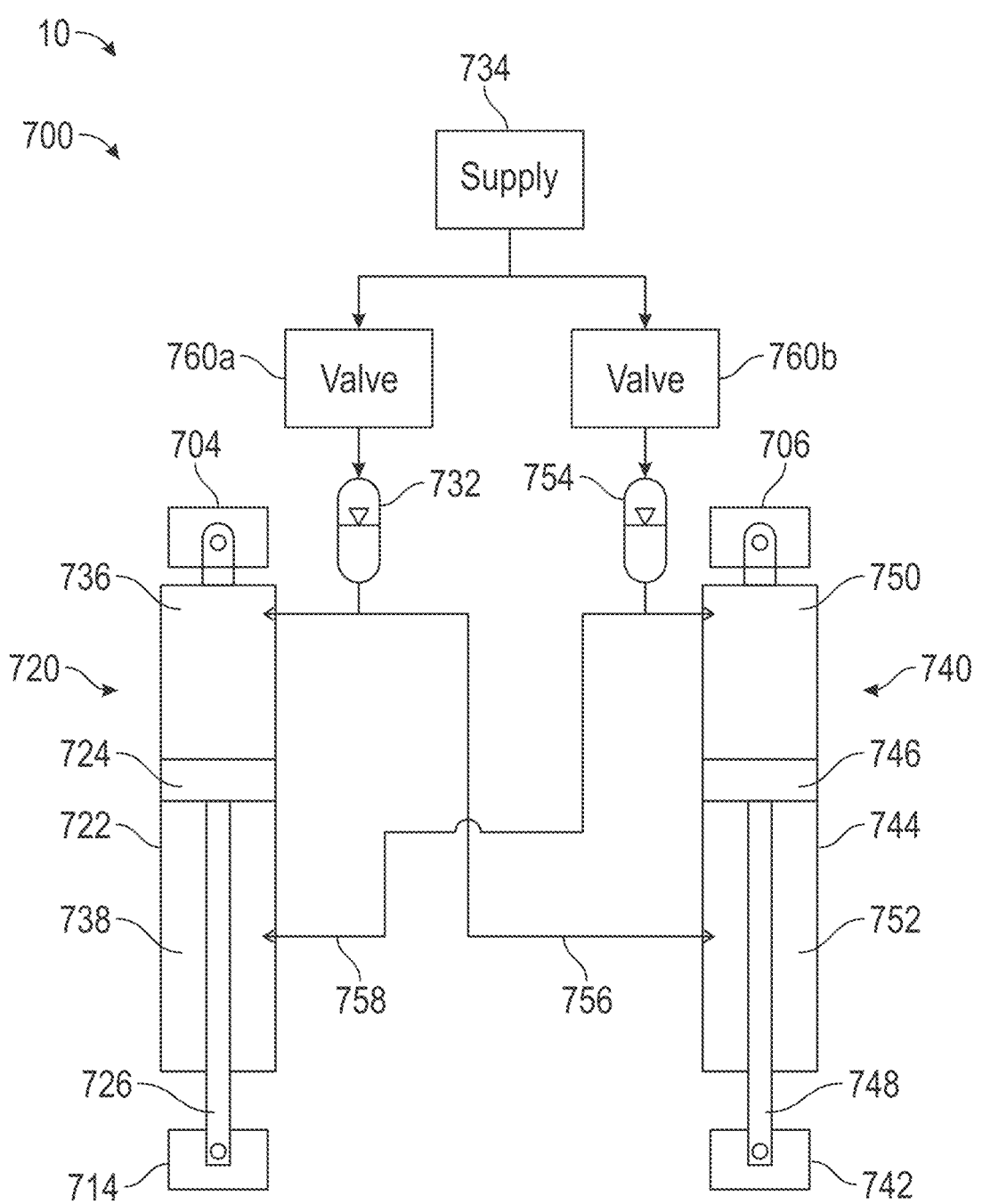
FIG. 10 is a schematic illustration of the suspension assembly of FIG. 8 including two valves, according to an exemplary embodiment.

In the illustrated embodiment, the suspension assembly 700 includes a single valve 760 arranged between the charge supply 734 and the first accumulator 732 and the second accumulator 754. In some embodiments, the suspension assembly 700 includes a first valve 760a arranged between the charge supply 734 and the first accumulator 732 and a second valve 760b arranged between the charge supply 734 and the second accumulator 754, as shown in FIG. 10. In general, the description herein relating to the valve 760 also applies to both the first valve 760a and the second valve 760b. In some embodiments, the first valve 760a and the second valve 760b are operated together so that the charge pressure in the first accumulator 732 and the second accumulator 754 are adjusted the same. In some embodiments, the first valve 760a and the second valve 760b may be operated independently to define a different charge pressure, and thereby a different roll rate or stiffness, in the first roll control cylinder 720 and the second roll control cylinder 740.

Figure 11:
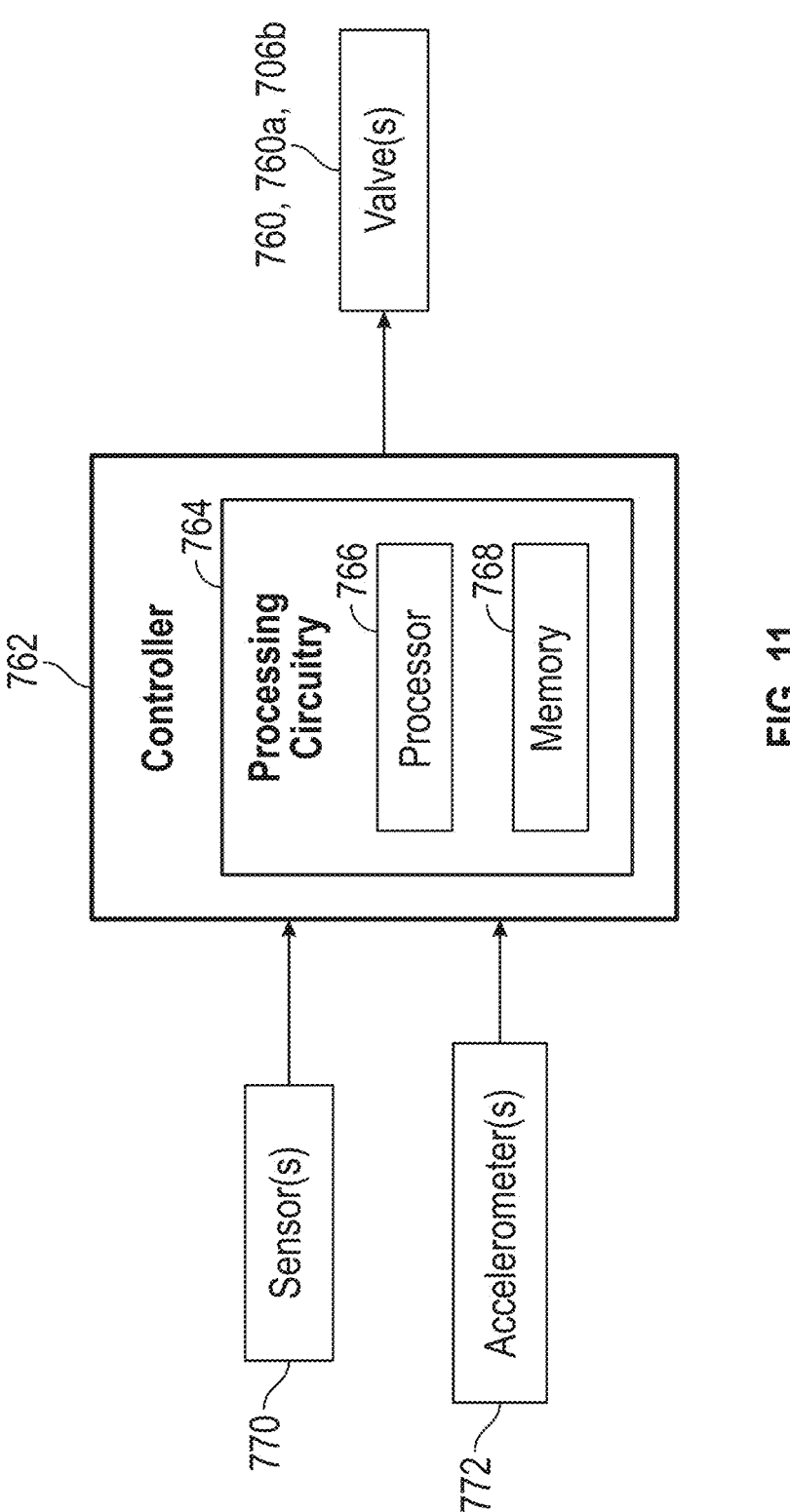
FIG. 11 is a schematic illustration of a controller of the suspension assembly of FIG. 8, according to an exemplary embodiment.

Turning to FIG. 11, in some embodiments, the valve 760 (and the integrated bleed valve within the first/second accumulators 732/754, or the first valve 760a and the second valve 760b) are in communication with a controller 762 that is configured to control operation of the valve 760 (e.g., the charge pressure in the first accumulator 732 and the second accumulator 754). In some embodiments, the controller 762 is a native controller on the vehicle 10 that communicates over a vehicle CAN bus. In some embodiments, the controller 762 is a dedicated controller that is included on the vehicle to control operations of the suspension assembly 700. The controller 762 includes a processing circuit 764 having a processor 766 and memory 768. The processing circuit 764 can be communicably connected to a communications interface such that the processing circuit 764 and the various components thereof can send and receive data via the communications interface. The processor 766 can be implemented as a general purpose processor, an application specific integrated circuit ("ASIC"), one or more field programmable gate arrays ("FPGAs"), a group of processing components, or other suitable electronic processing components.

The memory 768 (e.g., memory, memory unit, storage device, etc.) can include one or more devices (e.g., RAM, ROM, Flash memory, hard disk storage, etc.) for storing data and/or computer code for completing or facilitating the various processes, layers and modules described in the present application. The memory 768 can be or include volatile memory or non-volatile memory. The memory 768 can include database components, object code components, script components, or any other type of information structure for supporting the various activities and information structures described in the present application. According to some embodiments, the memory 768 is communicably connected to the processor 766 via the processing circuit 764 and includes computer code for executing (e.g., by the processing circuit 764 and/or the processor 766) one or more processes described herein.

In some embodiments, the controller 762 is in communication with one or more sensors 770, one or more accelerometers 772, and the valve 760 (and the integrated bleed valve within the first/second accumulators 732/754, or the first valve 760a and the second valve 760b). In some embodiments, the one or more sensors 770 include a roll rate sensor configured to measure a roll of the vehicle 10 (e.g., an encoder or an angle sensor), a yaw rate sensor configured to measure a yaw of the vehicle 10, pressure sensors configured to measure the charge pressure of the first accumulator 732 and the second accumulator 754, pressure sensors configured to measure the pressure in the first conduit 756 and the second conduit, 758, etc. The one or more accelerometers 772 may be positioned at various locations on the vehicle 10 (e.g., along the chassis 20, the cab 40, and or the body 80) to measure the acceleration as the vehicle 10 travels. In some embodiments, the controller 762 is configured to dynamically adjust the charge pressure of the first accumulator 732 and the second accumulator 754, and thereby the stiffness of the suspension assembly 700, based on data from the sensors 770 (e.g., roll rate sensor, yaw rate sensor, etc.) and/or the accelerometers 772. In some embodiments, the controller 762 is configured to dynamically adjust the charge pressure of the first accumulator 732 and the second accumulator 754, and thereby the stiffness of the suspension assembly 700, based on the combined data from the sensors 770 (e.g., roll rate sensor, yaw rate sensor, etc.) and/or the accelerometers 772. In some embodiments, the controller 762 is configured to adjust the charge pressure of the first accumulator 732 and the second accumulator 754 to achieve a target charge pressure, and thereby a target stiffness, based on data from the sensors 770 (e.g., pressure sensors).

In some embodiments, the stiffness of the suspension assembly 700 may be increased by increasing a charge pressure within the first accumulator 732 and the second accumulator 754, in response to one or more of the sensors 770 (e.g., a roll rate sensor) and/or the one or more accelerometers 772 detecting a vehicle condition requiring a stiffer suspension response (e.g., during a high-speed turn). For example, the one or more sensors 770 and/or the one or more accelerometers 772 may detect that the vehicle 10 is entering a high-speed turn (e.g., a signal from the sensor 770 and/or the accelerometer 772 is greater than or equal to a threshold value) and, in response, the controller 762 is configured to instruct the valve 760 (or the valves 760a, 760b) to open and allow the charge supply 734 to increase the pressure within the first accumulator 732 and the second accumulator 754. Alternatively or additionally, the controller 762 may receive in indication that aggressive handling is required by the vehicle 10 (e.g., based on geographic location or predetermined route/mission parameters) and, in response, instruct the valve 760 (or the valves 760a, 760b) to open and allow the charge supply 734 to increase the pressure within the first accumulator 732 and the second accumulator 754.

In some embodiments, the stiffness of the suspension assembly 700 may be decreased by decreasing a charge pressure within the first accumulator 732 and the second accumulator 754, in response to one or more of the sensors 770 (e.g., a roll rate sensor) and/or the one or more accelerometers 772 detecting a vehicle condition requiring a more compliant or softer suspension response (e.g., driving on rough roads or when rider comfort is prioritized). For example, the one or more sensors 770 and/or the one or more accelerometers 772 may detect that the vehicle 10 is not turning or detect that the vehicle is traversing bumpy terrain (e.g., a signal from the sensor 770 and/or the accelerometer 772 is less than a threshold value) and, in response, the controller 762 is configured to instruct the valve 760 (or the valves 760a, 760b) to move to a position where the pressure within the first accumulator 732 and the second accumulator 754 is allowed to bleed down and decrease the pressure therein. In some embodiments, the controller 762 may instruct a bleed valve within the valve 760, the first valve 760a, the second valve 760b, the first accumulator 732, and/or the second accumulator 754 to open and allow the pressure within the first accumulator 732 and the second accumulator 754 to decrease. Alternatively or additionally, the controller 762 may receive in indication that rider comfort is preferred by the vehicle 10 (e.g., based on geographic location or predetermined route/mission parameters) and, in response, instruct the valve 760 (or the valves 760a, 760b, or the bleed valves) to allow the charge pressure to decrease within the first accumulator 732 and the second accumulator 754.

While the suspension assembly 700 is described herein as adjusting or controlling the roll of the vehicle 10, the design and properties of the suspension assembly 700 may be applied to controlling or adjusting a pitch of the vehicle 10.

As utilized herein with respect to numerical ranges, the terms "approximately," "about," "substantially," and similar terms generally mean +/−10% of the disclosed values. When the terms "approximately," "about," "substantially," and similar terms are applied to a structural feature (e.g., to describe its shape, size, orientation, direction, etc.), these terms are meant to cover minor variations in structure that may result from, for example, the manufacturing or assembly process and are intended to have a broad meaning in harmony with the common and accepted usage by those of ordinary skill in the art to which the subject matter of this disclosure pertains. Accordingly, these terms should be interpreted as indicating that insubstantial or inconsequential modifications or alterations of the subject matter described and claimed are considered to be within the scope of the disclosure as recited in the appended claims.

It should be noted that the term "exemplary" and variations thereof, as used herein to describe various embodiments, are intended to indicate that such embodiments are possible examples, representations, or illustrations of possible embodiments (and such terms are not intended to connote that such embodiments are necessarily extraordinary or superlative examples).

The term "coupled" and variations thereof, as used herein, means the joining of two members directly or indirectly to one another. Such joining may be stationary (e.g., permanent or fixed) or moveable (e.g., removable or releasable). Such joining may be achieved with the two members coupled directly to each other, with the two members coupled to each other using a separate intervening member and any additional intermediate members coupled with one another, or with the two members coupled to each other using an intervening member that is integrally formed as a single unitary body with one of the two members. If "coupled" or variations thereof are modified by an additional term (e.g., directly coupled), the generic definition of "coupled" provided above is modified by the plain language meaning of the additional term (e.g., "directly coupled" means the joining of two members without any separate intervening member), resulting in a narrower definition than the generic definition of "coupled" provided above. Such coupling may be mechanical, electrical, or fluidic.

References herein to the positions of elements (e.g., "top," "bottom," "above," "below") are merely used to describe the orientation of various elements in the FIGURES. It should be noted that the orientation of various elements may differ according to other exemplary embodiments, and that such variations are intended to be encompassed by the present disclosure.

The hardware and data processing components used to implement the various processes, operations, illustrative logics, logical blocks, modules and circuits described in connection with the embodiments disclosed herein may be implemented or performed with a general purpose single- or multi-chip processor, a digital signal processor (DSP), an application specific integrated circuit (ASIC), a field programmable gate array (FPGA), or other programmable logic device, discrete gate or transistor logic, discrete hardware components, or any combination thereof designed to perform the functions described herein. A general purpose processor may be a microprocessor, or, any conventional processor, controller, microcontroller, or state machine. A processor also may be implemented as a combination of computing devices, such as a combination of a DSP and a microprocessor, a plurality of microprocessors, one or more microprocessors in conjunction with a DSP core, or any other such configuration. In some embodiments, particular processes and methods may be performed by circuitry that is specific to a given function. The memory (e.g., memory, memory unit, storage device) may include one or more devices (e.g., RAM, ROM, Flash memory, hard disk storage) for storing data and/or computer code for completing or facilitating the various processes, layers and modules described in the present disclosure. The memory may be or include volatile memory or non-volatile memory, and may include database components, object code components, script components, or any other type of information structure for supporting the various activities and information structures described in the present disclosure. According to an exemplary embodiment, the memory is communicably connected to the processor via a processing circuit and includes computer code for executing (e.g., by the processing circuit or the processor) the one or more processes described herein.

The present disclosure contemplates methods, systems and program products on any machine-readable media for accomplishing various operations. The embodiments of the present disclosure may be implemented using existing computer processors, or by a special purpose computer processor for an appropriate system, incorporated for this or another purpose, or by a hardwired system. Embodiments within the scope of the present disclosure include program products comprising machine-readable media for carrying or having machine-executable instructions or data structures stored thereon. Such machine-readable media can be any available media that can be accessed by a general purpose or special purpose computer or other machine with a processor. By way of example, such machine-readable media can comprise RAM, ROM, EPROM, EEPROM, or other optical disk storage, magnetic disk storage or other magnetic storage devices, or any other medium which can be used to carry or store desired program code in the form of machine-executable instructions or data structures and which can be accessed by a general purpose or special purpose computer or other machine with a processor. Combinations of the above are also included within the scope of machine-readable media. Machine-executable instructions include, for example, instructions and data which cause a general purpose computer, special purpose computer, or special purpose processing machines to perform a certain function or group of functions.

Although the figures and description may illustrate a specific order of method steps, the order of such steps may differ from what is depicted and described, unless specified differently above. Also, two or more steps may be performed concurrently or with partial concurrence, unless specified differently above. Such variation may depend, for example, on the software and hardware systems chosen and on designer choice. All such variations are within the scope of the disclosure. Likewise, software implementations of the described methods could be accomplished with standard programming techniques with rule-based logic and other logic to accomplish the various connection steps, processing steps, comparison steps, and decision steps.

It is important to note that the construction and arrangement of the suspension assembly 700 as shown in the various exemplary embodiments is illustrative only. Additionally, any element disclosed in one embodiment may be incorporated or utilized with any other embodiment disclosed herein. For example, the suspension assembly 700 of the exemplary embodiments shown in at least FIGS. 8-11 may be incorporated in the vehicles 10 of the exemplary embodiments shown in FIGS. 1-7. Although only one example of an element from one embodiment that can be incorporated or utilized in another embodiment has been described above, it should be appreciated that other elements of the various embodiments may be incorporated or utilized with any of the other embodiments disclosed herein.

What is claimed is:

1. A suspension assembly for a vocational vehicle, the vocational vehicle including a chassis having a frame rail, the suspension assembly comprising:

an upper control arm;

a lower control arm;

a damper coupled between the lower control arm and the frame rail;

a spring coupled between the lower control arm and the frame rail;

a roll control cylinder coupled between the lower control arm and the frame rail, wherein the roll control cylinder includes:

a body defining an internal cavity;

19 a piston movably arranged within the internal cavity, wherein the piston divides the internal cavity into a piston chamber and a rod chamber; and a rod coupled to the piston and extending outwardly from the body;

an accumulator in fluid communication with the piston chamber; and a charge supply in fluid communication with the accumulator, wherein the charge supply is configured to selectively change a charge pressure within the accumulator to adjust a roll rate or stiffness defined by the roll control cylinder.

2. The suspension assembly of claim 1, further comprising a valve arranged between the charge supply and the accumulator, and configured to selectively connect the accumulator to the charge supply to increase the charge pressure or selectively bleed the charge pressure.

3. The suspension assembly of claim 1, wherein the charge supply is a pump or a compressed gas tank.

4. The suspension assembly of claim 1, wherein the damper and the spring extend coaxially.

5. The suspension assembly of claim 1, wherein the accumulator is coupled to the frame rail.

6. The suspension assembly of claim 1, wherein the roll control cylinder is a first roll control cylinder, and the suspension assembly further includes a second roll control cylinder that is cross plumbed with the first roll control cylinder.

7. The suspension assembly of claim 6, wherein the accumulator is a first accumulator and the suspension assembly further includes a second accumulator in fluid communication with a piston chamber of the second roll control cylinder.

8. The suspension assembly of claim 7, further comprising a roll sensor configured to detect a roll rate, a valve arranged between the charge supply and both the first accumulator and the second accumulator configured to selectively connect the accumulator to the charge supply to increase the charge pressure or selectively bleed the charge pressure, and a controller in communication with the roll sensor and the valve.

9. The suspension assembly of claim 8, wherein the controller is configured to move the valve to increase a charge pressure within the first accumulator and the second accumulator in response to a signal from the roll sensor being greater than or equal to a threshold value.

10. The suspension assembly of claim 8, wherein the controller is configured to move the valve to decrease a charge pressure within the first accumulator and the second accumulator in response to a signal from the roll sensor being less than a threshold value.

11. A vocational vehicle comprising:

a chassis including a first frame rail and a second frame rail; and a suspension assembly including:

an upper control arm;

a lower control arm;

a damper coupled between the lower control arm and the first frame rail;

a spring coupled between the lower control arm and the first frame rail;

a roll control cylinder coupled between the lower control arm and the first frame rail, wherein the roll control cylinder includes:

a body defining an internal cavity;

20 a piston movably arranged within the internal cavity, wherein the piston divides the internal cavity into a piston chamber and a rod chamber; and a rod coupled to the piston and extending outwardly from the body;

an accumulator in fluid communication with the piston chamber; and a charge supply in fluid communication with the accumulator, wherein the charge supply is configured to selectively change a charge pressure within the accumulator to adjust a roll rate or stiffness defined by the roll control cylinder.

12. The vocational vehicle of claim 11, further comprising a valve arranged between the charge supply and the accumulator, and configured to selectively connect the accumulator to the charge supply to increase the charge pressure or selectively bleed the charge pressure.

13. The vocational vehicle of claim 11, wherein the charge supply is a pump or a compressed gas tank.

14. The vocational vehicle of claim 11, wherein the damper and the spring extend coaxially.

15. The vocational vehicle of claim 11, wherein the accumulator is coupled to the first frame rail.

16. The vocational vehicle of claim 11, wherein the roll control cylinder is a first roll control cylinder, and the suspension assembly further includes a second roll control cylinder that is cross plumbed with the first roll control cylinder, and wherein the accumulator is a first accumulator and the suspension assembly further includes a second accumulator in fluid communication with a piston chamber of the second roll control cylinder.

17. The vocational vehicle of claim 16, further comprising a roll sensor configured to detect a roll rate, a valve arranged between the charge supply and both the first accumulator and the second accumulator configured to selectively connect the accumulator to the charge supply to increase the charge pressure or selectively bleed the charge pressure, and a controller in communication with the roll sensor and the valve.

18. The vocational vehicle of claim 17, wherein the controller is configured to move the valve to increase or decrease a charge pressure within the first accumulator and the second accumulator in response to a signal from the roll sensor being greater or less than a threshold value.

19. A vocational vehicle comprising:

a chassis including a first frame rail and a second frame rail; and a suspension assembly including:

a first suspension subassembly including:

a first roll control cylinder coupled to the first frame rail; and a first accumulator in fluid communication with the first roll control cylinder;

a second suspension subassembly including:

a second roll control cylinder coupled to the second frame rail; and a second accumulator in fluid communication with the second roll control cylinder, wherein the first roll control cylinder is cross plumbed with the second roll control cylinder; and a charge supply in fluid communication with both the first accumulator and the second accumulator, wherein the charge supply is configured to selectively change a charge pressure within both the first accumulator and the second accumulator to adjust a roll rate or stiffness defined by the first roll control cylinder and the second roll control cylinder.

* * * * *